United States Patent
Nakamura

(10) Patent No.: US 7,562,142 B2
(45) Date of Patent: Jul. 14, 2009

(54) SYSTEM AND METHOD FOR NETWORK CONNECTION

(75) Inventor: Tetsuya Nakamura, Shizuoka (JP)

(73) Assignee: NEC Corporation, Tokyo (JP)

( * ) Notice: Subject to any disclaimer, the term of this patent is extended or adjusted under 35 U.S.C. 154(b) by 280 days.

(21) Appl. No.: 10/981,614

(22) Filed: Nov. 5, 2004

(65) Prior Publication Data

US 2005/0102408 A1 May 12, 2005

(30) Foreign Application Priority Data

Nov. 7, 2003 (JP) ............................. 2003-379194

(51) Int. Cl.
*G06F 15/173* (2006.01)
(52) U.S. Cl. ...................... 709/225; 709/222
(58) Field of Classification Search ................. 709/222, 709/225
See application file for complete search history.

(56) References Cited

U.S. PATENT DOCUMENTS

| | | | | |
|---|---|---|---|---|
| 6,012,088 | A * | 1/2000 | Li et al. ........................ | 709/219 |
| 6,189,102 | B1 * | 2/2001 | Beser .............................. | 726/2 |
| 6,542,266 | B1 * | 4/2003 | Phillips et al. ................. | 398/54 |
| 6,715,075 | B1 * | 3/2004 | Loukianov ................... | 713/176 |
| 7,079,527 | B2 * | 7/2006 | Owens ........................ | 370/352 |
| 7,092,943 | B2 * | 8/2006 | Roese et al. ................... | 707/9 |
| 7,159,016 | B2 * | 1/2007 | Baker ........................... | 709/220 |
| 2001/0045451 | A1 * | 11/2001 | Tan et al. ...................... | 235/375 |
| 2004/0261116 | A1 * | 12/2004 | Mckeown et al. ........... | 725/109 |

FOREIGN PATENT DOCUMENTS

| | | |
|---|---|---|
| JP | 11-127265 A | 5/1999 |
| JP | 2001-325176 A | 11/2001 |
| JP | 2003-32362 A | 1/2003 |

* cited by examiner

*Primary Examiner*—Andrew Caldwell
*Assistant Examiner*—Christopher Biagini
(74) *Attorney, Agent, or Firm*—Sughrue Mion, PLLC

(57) ABSTRACT

A network connection system and a network connection method for facilitating the start of network access service without using information unique to subscriber terminal equipment. Having received a request for telecommunications service from one of subscriber terminal equipment, intermediary equipment informs a telecommunications carrier server of the port number of a physical port to which the telecommunications service request has been input. In addition, the intermediary equipment informs the telecommunications carrier server of logical link information and physical link information of the subscriber terminal equipment which has sent the telecommunications service request contained in the request. The telecommunications carrier server sends the subscriber terminal equipment subscriber identification information corresponding to the port number. The subscriber terminal equipment sends an ISP server the subscriber identification information. When having received the subscriber identification information, the ISP server sets subscriber setting information for the subscriber terminal equipment.

12 Claims, 15 Drawing Sheets

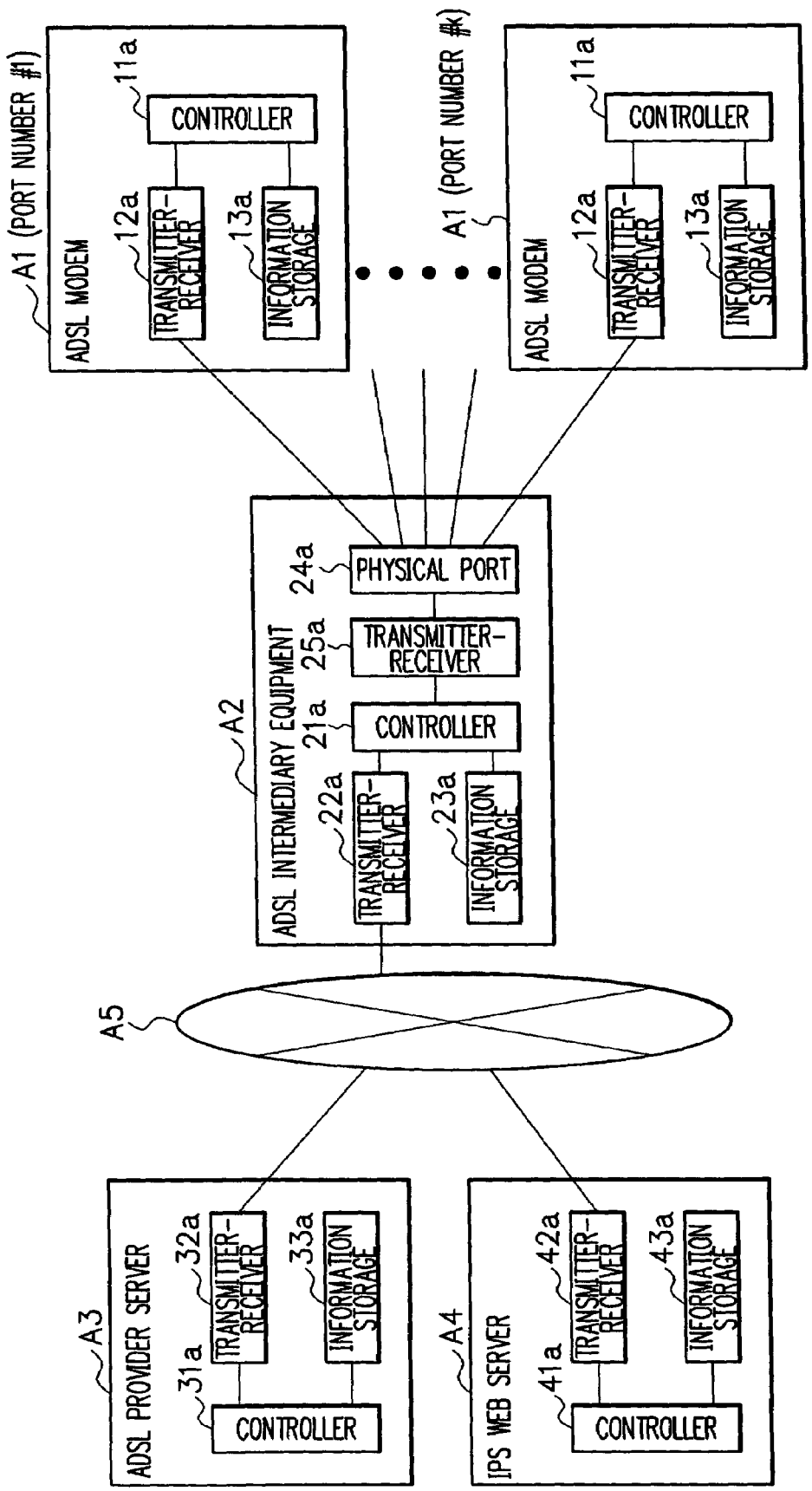
F I G. 7

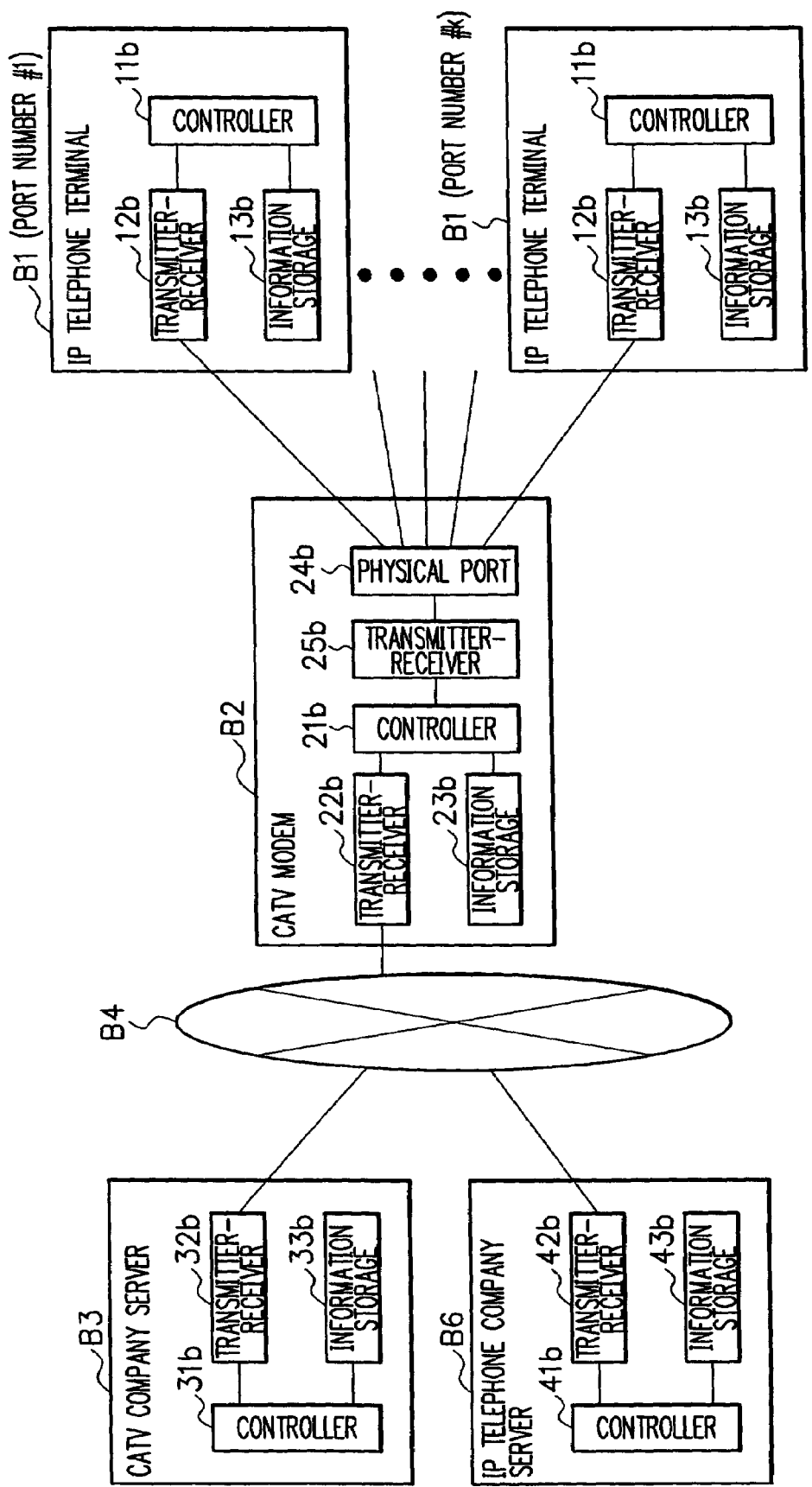
F I G. 13

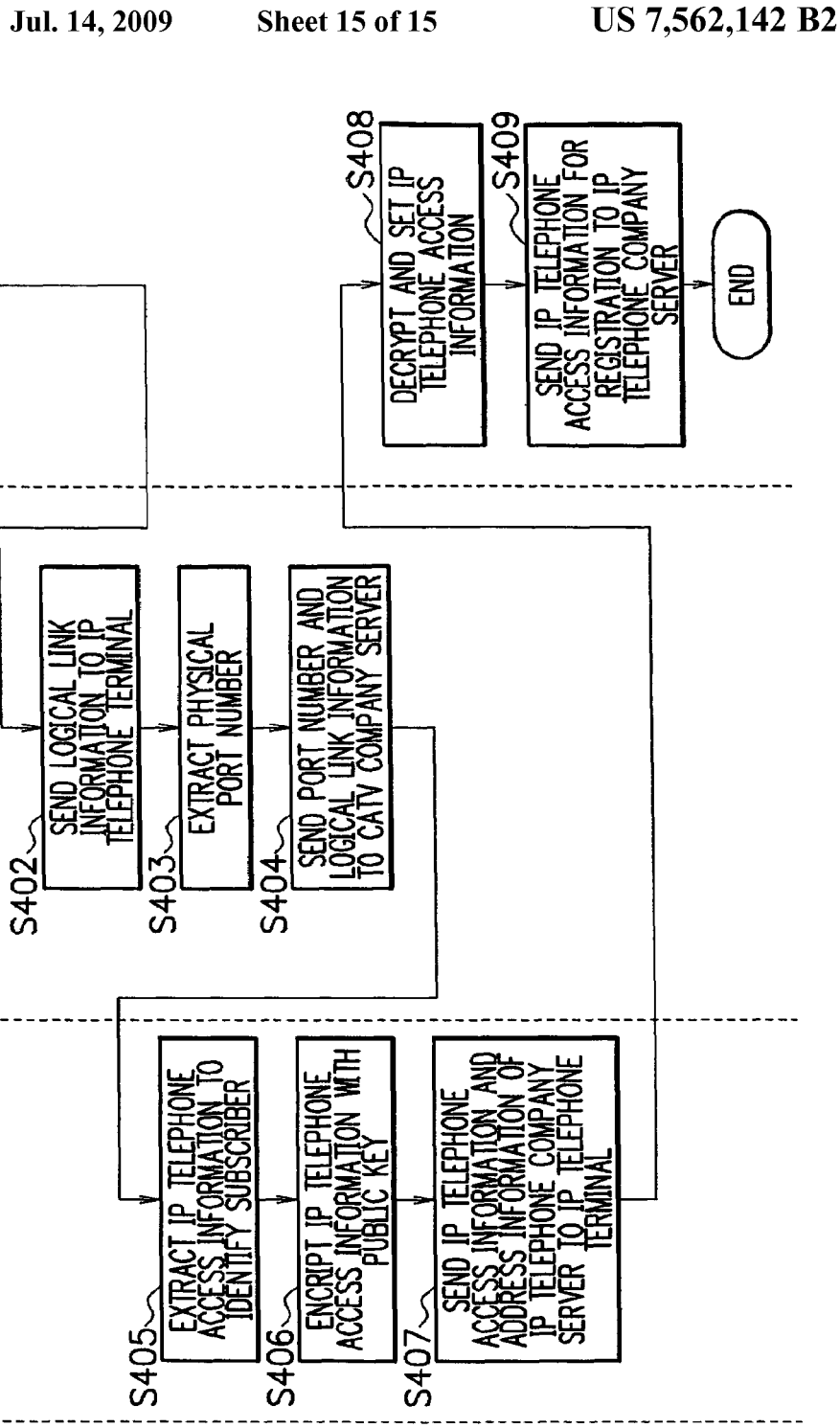

SYSTEM AND METHOD FOR NETWORK CONNECTION

FIELD OF THE INVENTION

The present invention relates to a system and a method for network connection, and more particularly to, a system and a method for accessing a network through an access line.

BACKGROUND OF THE INVENTION

It is often the case that telecommunications services and Internet access services are performed by different companies. When a telecommunications carrier offers services to a subscriber to an ISP (Internet service provider), the carrier performs authentication using PPPoE (Point to Point Protocol over Ethernet) or PPPoA (Point to Point Protocol over ATM) which the carrier supports to determine if the subscriber is permitted to access an ISP network. On this occasion, the telecommunications carrier requires authentication information from the subscriber. Accordingly, the subscriber to the ISP needs to make a setting to access the ISP network by manually inputting subscriber setting information distributed by the ISP to subscriber terminal equipment.

In the following, a description will be made of a conventional method for manually making a setting to access an ISP network in subscriber terminal equipment as described above referring to FIG. 1.

FIG. 1 is a diagram for explaining an example of a conventional method for manually establishing a network connection.

In FIG. 1, after subscriber terminal equipment C1 is connected to intermediary equipment C2, a subscriber inputs subscriber setting information sent from an ISP to the equipment C1. Thereby, the subscriber terminal equipment C1 is connected to an ISP network C6.

The conventional manual setting method, however, has some problems as follows.

The ISP is required to distribute subscriber setting information to subscribers by mail or the like so that each subscriber can manually input the subscriber setting information to make a setting.

In addition, since each subscriber manually inputs the subscriber setting information to make a setting, errors in inputting the information made by the subscriber impose a burden on the support of the ISP.

In order to avoid the problems mentioned above, there have been proposed methods of automatically making a setting to access an ISP network for subscriber terminal equipment. A conventional automatic setting method will be described referring to FIG. 2.

FIG. 2 is a diagram showing an example of a conventional method for automatically establishing a network connection.

In FIG. 2, when subscriber terminal equipment D1 is sent to a subscriber, the personal information of the subscriber and the MAC (Media Access Control) address of the equipment D1 are registered in advance with a telecommunications carrier server D3. The subscriber terminal equipment D1 accesses a telecommunications carrier network D5 using information unique to the equipment D1 such as the MAC address. The telecommunications carrier server D3 verifies the MAC address triggered by the access to the telecommunications carrier network D5, and sets ISP subscriber setting information for the subscriber terminal equipment D1. Triggered by the completion of the setting, the subscriber setting information is deployed inside the subscriber terminal equipment D1. The subscriber terminal equipment D1 is disconnected from the telecommunications carrier network D5, and connected to an ISP network D6 according to the subscriber setting information.

There is found a conventional technique relating to the connection of a communication apparatus to an ISP network in Japanese Patent Application laid open No. 2001-325176 (Reference 1). Reference 1 discloses "Providing/Receiving Communication Method of Internet Access Information, Communication System and Information Recording Medium". According to Reference 1, a user terminal selects a provider from screen display and inputs user information, thus automatically downloading its information setting.

Besides, as another conventional technique, Japanese Patent Application laid open No. 2003-32362 (Reference 2) discloses "Access Authentication Controller, Communication Terminal, Access Authentication System, Access Authentication Method and Program". According to Reference 2, when a user dials a particular dial number on a communication terminal, a server automatically makes an information setting for the communication terminal.

The conventional automatic setting method, however, creates some problems as follows.

Between communication equipment of an ISP or a telecommunications carrier and subscriber terminal equipment, a connection is established based on information unique to the subscriber terminal equipment. Consequently, there is a possibility that charges for service are not appropriately collected from subscribers in cases, for example, where a subscriber has changed the subscriber terminal equipment, where the subscriber terminal equipment has been wrongly delivered to a subscriber, and where the subscriber terminal equipment has been bought and sold between subscribers.

In the conventional technique according to reference 1, a subscriber has to input setting information to access a network.

In the conventional technique according to reference 2, a network connection is established based on dynamic information like a caller number of a communication terminal. Therefore, when the caller number is changed, it may be difficult to access a network. Additionally, since a known subscriber line such as xDSL (xDigital Subscriber Line) is utilized to identify a user, it is impossible to make a setting for a user who is not a subscriber to the line. Further, a dialing destination must be registered for each ISP in advance, and there is a need for a communication terminal with respect to each ISP. Still further, each ISP has to be provided with a device to identify a caller based on the caller's telephone number, which increases the cost of installing equipment in the ISP.

SUMMARY OF THE INVENTION

It is therefore an object of the present invention to provide a system and a method for network connection, facilitating access to a network without information unique to subscriber terminal equipment.

In accordance with the first aspect of the present invention, to achieve the object mentioned above, there is provided a network connection system comprising: one or more network access devices managed by one or more subscribers to network access service, each connecting via an access line to a network; a network relay device managed by a telecommunications carrier that offers the use of the access line(s), connected to the one or more network access devices through the access line(s); and an ISP server managed by a network service provider that offers network access service; wherein the network relay device includes one or more access units connectable to the one or more network access devices, respectively, through the access line(s) and an access unit identify unit to identify the access unit connected to the network access device; and the ISP server includes a setting information storage to store setting information necessary for the use of the network access service with respect to each subscriber and an information setting unit to set the setting information for the network access device connected to the access unit identified by the access unit identify unit.

In accordance with the second aspect of the present invention, the ISP server further includes a setting information encryption unit to encrypt the setting information with a public key, and the network access device includes a setting information decryption unit to decrypt the setting information encrypted by the setting information encryption unit with a secret or private key corresponding to the public key.

In accordance with the third aspect of the present invention, the network connection system further comprises a telecommunications carrier server managed by the telecommunications carrier, the network access device further includes an identified access unit informing unit to send information on the access unit identified by the access unit identify unit to the telecommunications carrier server; the telecommunications carrier server includes an access unit information storage to store information on the one or more network access devices connectable to the one or more access units, respectively, and an access device identify unit to identify the network access device connectable to the identified access unit on receipt of the identified access unit information; and the information setting unit sets the setting information for the network access device identified by the access device identify unit.

In accordance with the fourth aspect of the present invention, the network access device further includes a specification information storage to store information on the specifications of the device itself; the telecommunications carrier server further includes an access device specification information storage to store information on the specifications of each of the one or more network access devices, a specification information request unit to send a request for the specification information stored in the specification information storage to the network access device identified by the access device identify unit, and a specification information comparator to compare the specification information received from the identified network access device in response to the specification information request with the specification information of the identified network access device stored in the access device specification information storage; and the information setting unit sets the setting information for the identified network access device when both the specification information match.

In accordance with the fifth aspect of the present invention, there is provided a network connection method applied to a network connection system comprising: one or more network access devices managed by one or more subscribers to network access service, each connecting via an access line to a network; a network relay device managed by a telecommunications carrier that offers the use of the access line(s), connected to the one or more network access devices through the access line(s); and an ISP server managed by a network service provider that offers network access service; wherein the network relay device includes one or more access units connectable to the one or more network access devices, respectively, through the access line(s); the network connection method comprising the steps of: by the network relay device, identifying the access unit to which the network access device is connected; storing setting information necessary for the use of the network access service in the ISP server with respect to each subscriber; and, by the ISP server, setting the setting information for the network access device connected to the identified access unit.

In accordance with the sixth aspect of the present invention, the network connection method further comprises the steps of: by the ISP server, encrypting the setting information with a public key; and, by the network access device, decrypting the encrypted setting information with a secret or private key corresponding to the public key.

In accordance with the seventh aspect of the present invention, the network connection system further comprises a telecommunications carrier server managed by the telecommunications carrier, the network connection method further comprises the steps of: sending information on the identified access unit to the telecommunications carrier server from the network relay device; and, by the telecommunications carrier server, identifying the network access device connectable to the identified access unit on receipt of the identified access unit information; and in the step of setting the setting information, the ISP server sets the setting information for the identified network access device.

In accordance with the eighth aspect of the present invention, the network connection method further comprises the steps of: by the telecommunications carrier server, storing information on the specifications of each of the one or more network access devices; sending a request for information on the specifications of the identified network access device from the telecommunications carrier server to the identified network access device; sending the specification information to the telecommunications carrier server from the network access device; and, by the telecommunications carrier server, comparing the specification information received from the identified network access device with the specification information of the identified network access device stored in the telecommunications carrier server; and in the step of setting the setting information, the ISP server sets the setting information for the identified network access device when both the specification information match.

BRIEF DESCRIPTION OF THE DRAWINGS

The objects and features of the present invention will become more apparent from the consideration of the following detailed description taken in conjunction with the accompanying drawings in which:

FIG. 7 is a block diagram showing the construction of a network connection system according to the first embodiment of the present invention;

FIG. 13 is a block diagram showing the construction of a network connection system according to the third embodiment of the present invention;

FIG. 15 is a flowchart showing the operation flow of the network connection system depicted in FIG. 13.

DESCRIPTION OF THE PREFERRED EMBODIMENTS

Figure 1:
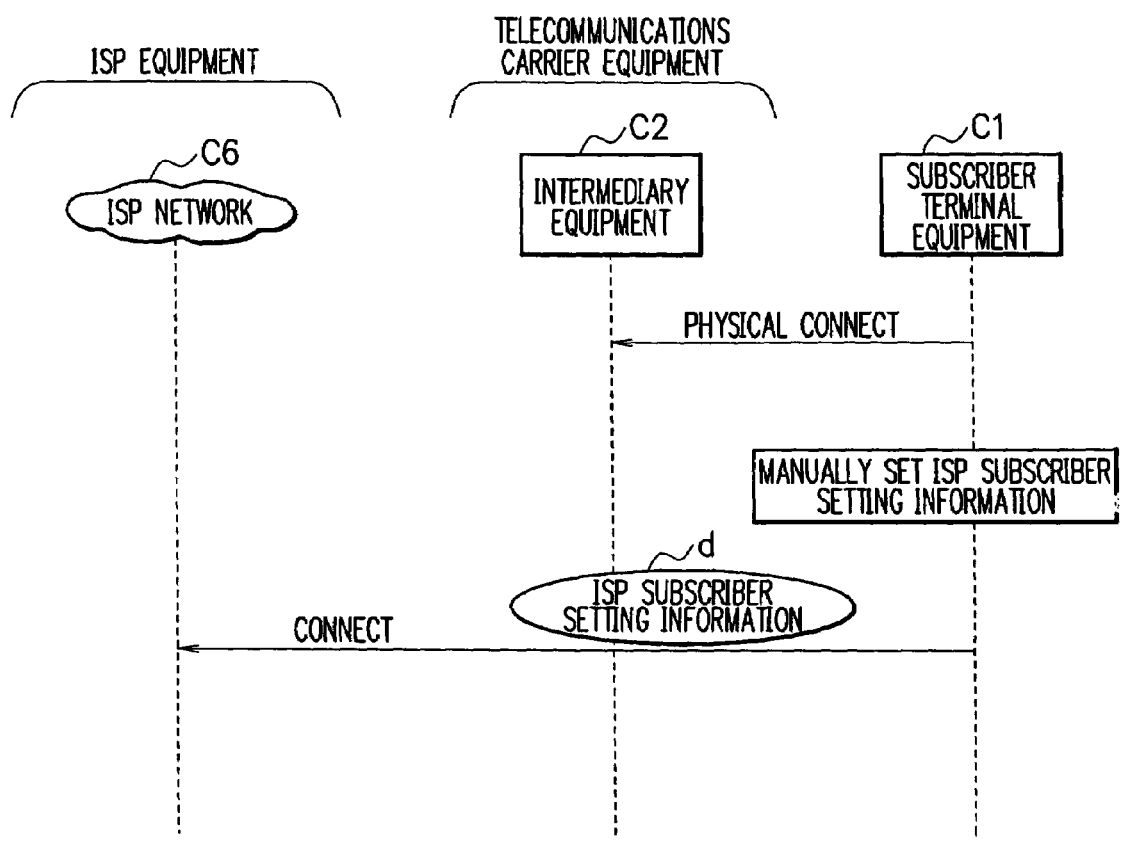
FIG. 1 is a diagram for explaining a conventional method of manually establishing a network connection.
Figure 2:
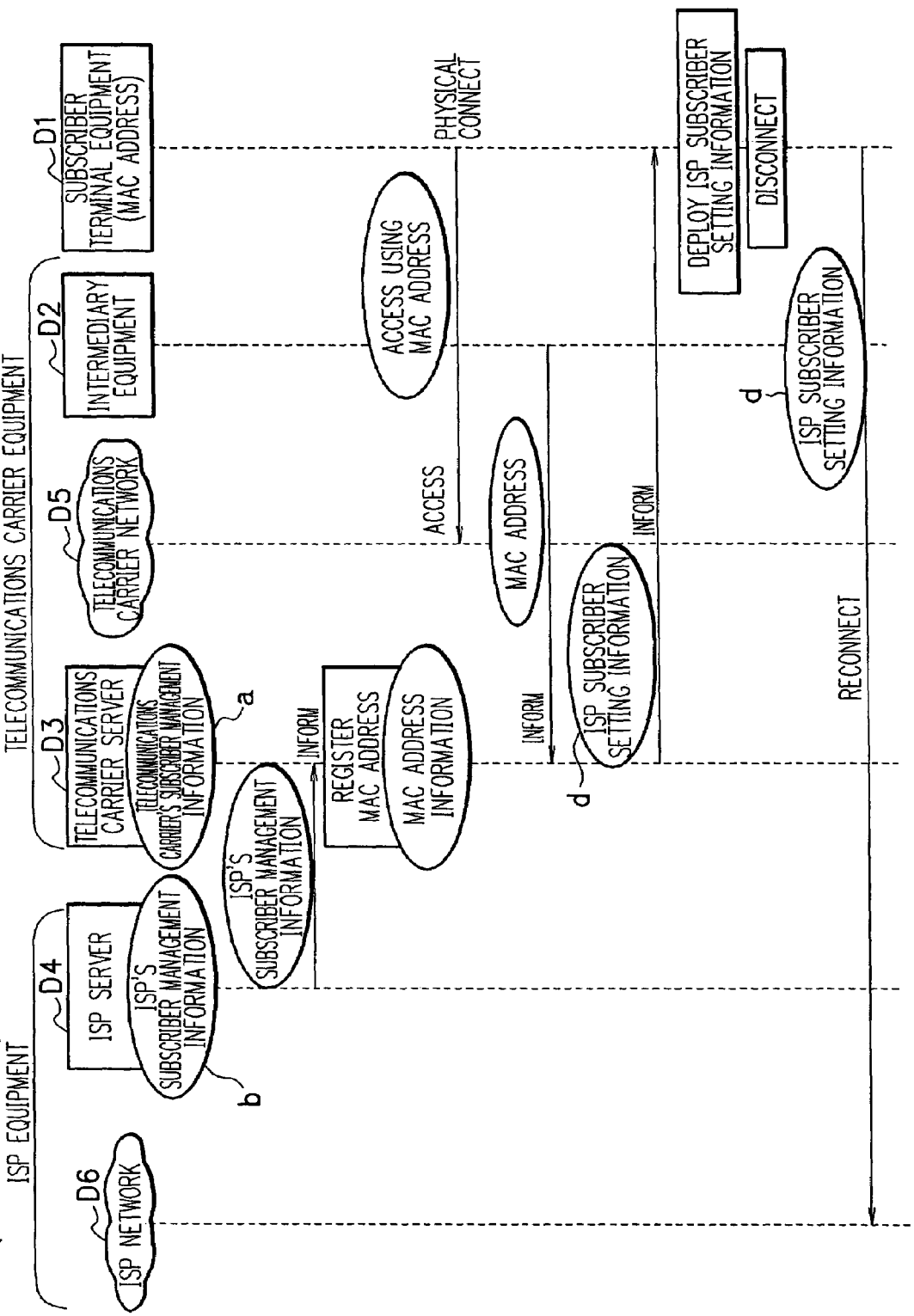
FIG. 2 is a diagram showing a conventional method of automatically establishing a network connection.

Referring now to the drawings, a description of preferred embodiments of the present invention will be given in detail.

Figure 3:
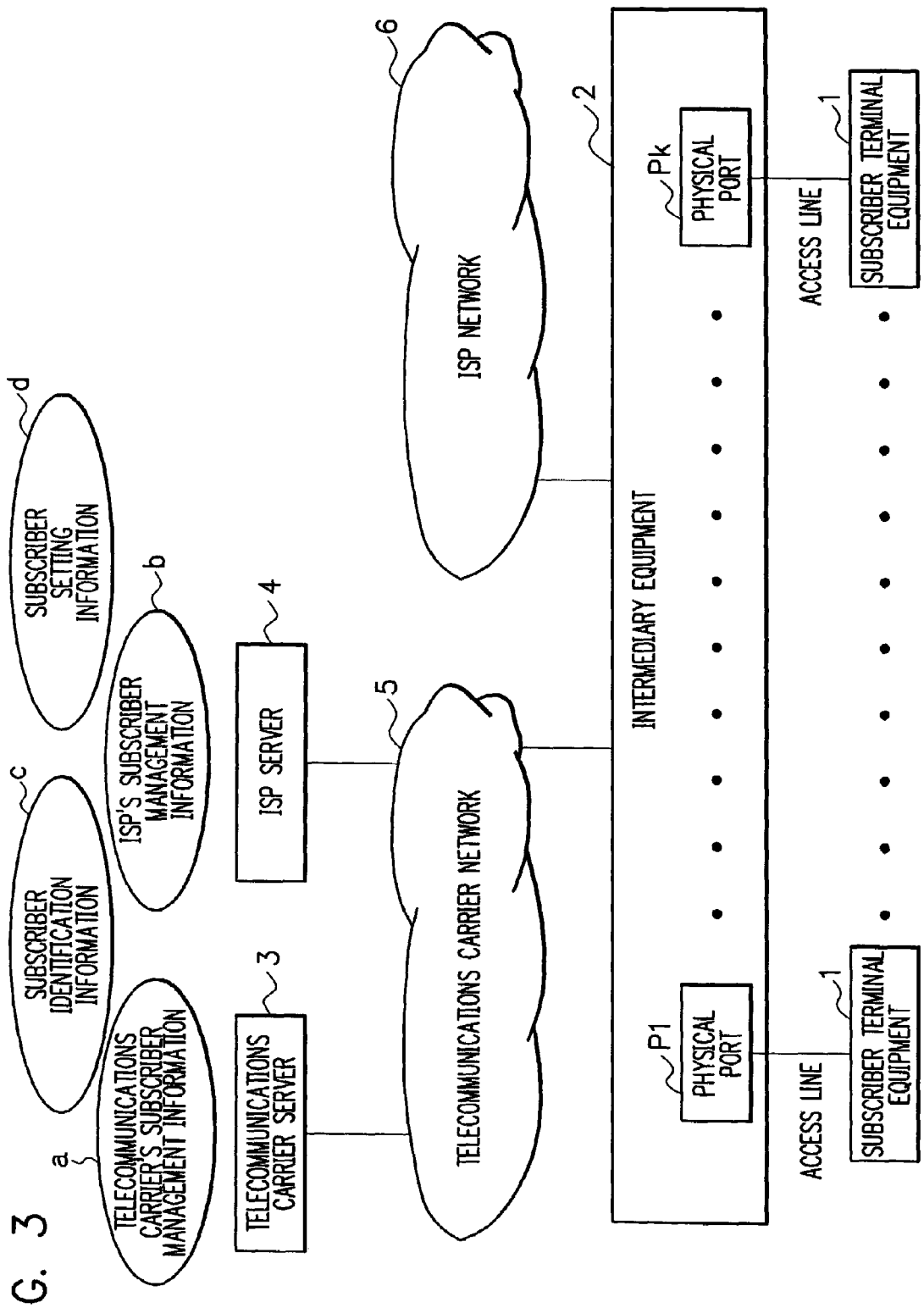
FIG. 3 is a schematic diagram showing the construction of a network connection system according to an embodiment of the present invention.
Figure 4:
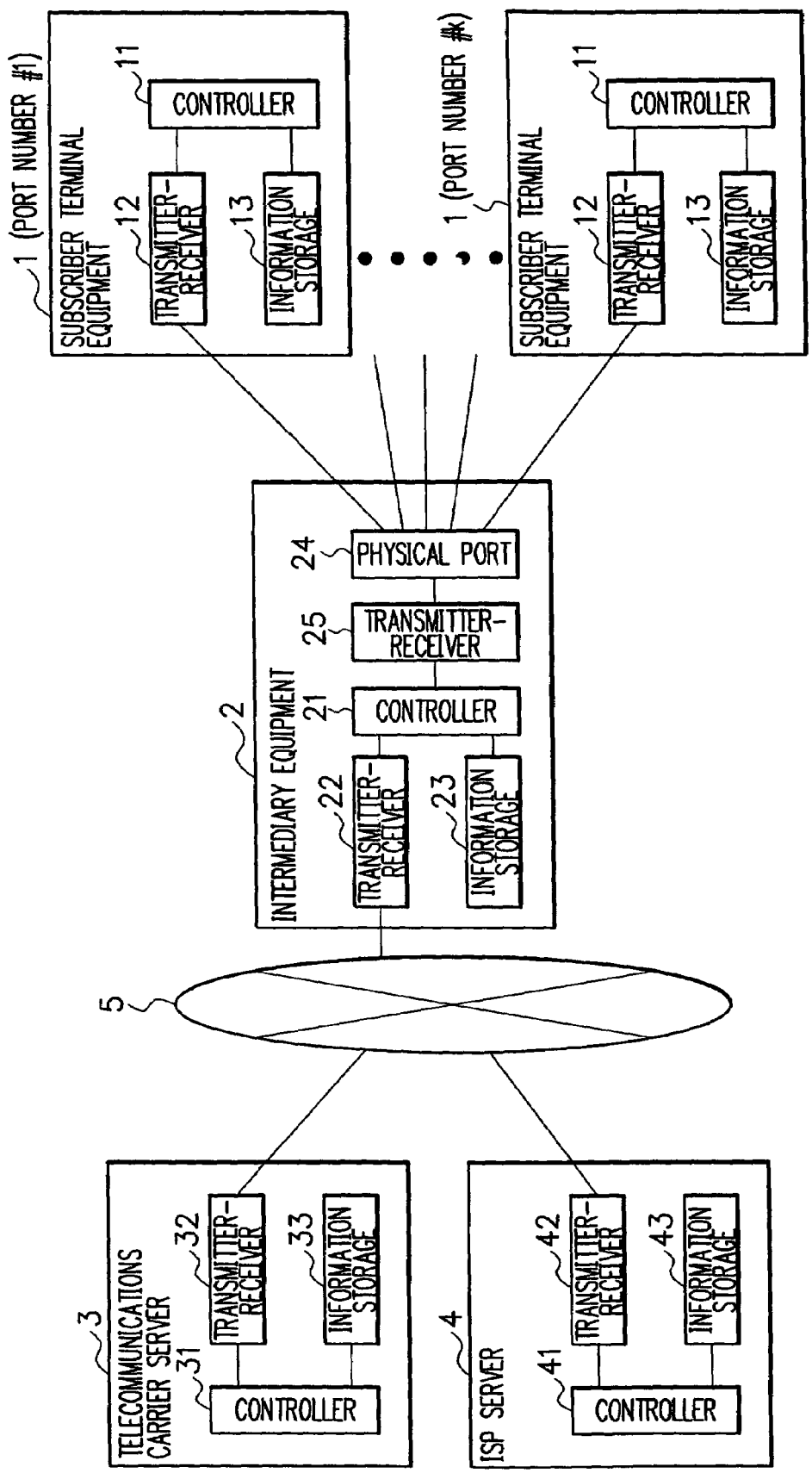
FIG. 4 is a block diagram showing the construction of the network connection system according to the embodiment of the present invention.

FIG. 3 is a diagram schematically showing the construction of a network connection system according to an embodiment of the present invention. FIG. 4 is a block diagram showing the construction of the network connection system according to the embodiment of the present invention.

In the following, a description will be made of the construction of the network connection system and the operation of each component according to the embodiment referring to FIGS. 3 and 4.

As can be seen in FIGS. 3 and 4, the network connection system comprises at least one piece of subscriber terminal equipment 1, intermediary equipment 2, a telecommunications carrier server 3, an ISP (Internet service provider) server 4, a telecommunications carrier network 5, and an ISP network 6.

The subscriber terminal equipment 1 is a network access device which is installed in a place (subscriber's home, office, etc.) associated with a subscriber who has a contract with an ISP and uses telecommunications services such as Internet access service and IP (Internet Protocol) telephone service.

The network connection system of this embodiment includes one or more subscriber terminal equipment 1, and each of the subscriber terminal equipment 1 is connected via an access line to the intermediary equipment 2.

Besides, as shown in FIG. 4, the subscriber terminal equipment 1 is provided with a controller 11, a transmitter-receiver 12 and an information storage 13.

The controller 11 is connected with the transmitter-receiver 12 and the information storage 13 to control the entire subscriber terminal equipment 1 including the transmitter-receiver 12 and the information storage 13. The controller 11 may include a CPU (Central Processing Unit) and a storage area for storing a program that makes the CPU perform its operations.

The transmitter-receiver 12 transmits and receives data via the access line, and carries out operations, such as for example modulation and demodulation.

The information storage 13 stores in advance information for accessing the telecommunications carrier network 5 (hereinafter referred to as telecommunications carrier common information).

The intermediary equipment 2 is a network relay device managed by a telecommunications carrier, and connects the access line(s) to the telecommunications carrier network 5 as well as connecting the access line(s) to the ISP network 6.

As shown in FIG. 4, the intermediary equipment 2 is provided with a controller 21, transmitter-receivers 22 and 25, an information storage 23, and a physical port 24.

The controller 21 is connected with the transmitter-receivers 22 and 25 and the information storage 23 to control the entire intermediary equipment 2 including the transmitter-receivers 22 and 25 and the information storage 23. The controller 21 may include a CPU and a storage area for storing a program that makes the CPU perform its operations.

The transmitter-receiver 22 transmits and receives data via the telecommunications carrier network 5 or the ISP network 6.

The physical port 24 is composed of one or more physical ports. The one or more physical ports have one or more lines, each connected to the different subscriber terminal equipment 1.

A port number or a physical port number is assigned to each physical port to identify the port. The information storage 23 stores information as to the association between each physical port and its port number.

The transmitter-receiver 25 transmits and receives data via each access line connected to the physical port 24, and carries out operations, such as for example modulation and demodulation.

Having received a request for telecommunications service from one of the subscriber terminal equipment 1, the intermediary equipment 2 informs the telecommunications carrier server 3 of the port number of the physical port to which the telecommunications service request has been input. In addition, the intermediary equipment 2 informs the telecommunications carrier server 3 of logical link information and physical link information of the subscriber terminal equipment 1 which has sent the telecommunications service request contained in the request.

The telecommunications carrier server 3 is an information processor managed by a telecommunications carrier that offers the use of the access line connecting the subscriber terminal equipment 1 to the ISP network 6 to subscribers. Examples of the telecommunications carrier server 3 include a high-end PC (personal computer) such as a workstation.

As shown in FIG. 4, the telecommunications carrier server 3 is provided with a controller 31, a transmitter-receiver 32 and an information storage 33.

The controller 31 is connected with the transmitter-receiver 32 and the information storage 33 to control the entire telecommunications carrier server 3 including the transmitter-receiver 32 and the information storage 33. The controller 31 may include a CPU and a storage area for storing a program that makes the CPU perform its operations.

The transmitter-receiver 32 transmits and receives data.

The information storage 33 stores telecommunications carrier's subscriber management information a and subscriber identification information c. The telecommunications carrier's subscriber management information a is information concerning subscribers. Examples of the telecommunications carrier's subscriber management information a include personal information (such as name, address and telephone number) and the port number of the physical port in the intermediary equipment 2 which is connected to the access line provided to the place associated with each subscriber: the access line connected to the subscriber terminal equipment 1.

The subscriber identification information c is information that uniquely identifies each subscriber. The subscriber identification information c may be a combination of numbers, letters or characters, symbols and the like.

The telecommunications carrier's subscriber management information a corresponds one-to-one with the subscriber identification information c.

The ISP server 4 is an information processor managed by an ISP that offers service so that subscribers can have access to the Internet (ISP network 6) through the use of their subscriber terminal equipment 1. Examples of the ISP server 4 include a high-end PC such as a workstation.

As shown in FIG. 4, the ISP server 4 is provided with a controller 41, a transmitter-receiver 42 and an information storage 43.

The controller 41 is connected with the transmitter-receiver 42 and the information storage 43 to control the entire ISP server 4 including the transmitter-receiver 42 and the information storage 43. The controller 41 may include a CPU and a storage area for storing a program that makes the CPU perform its operations.

The transmitter-receiver 42 transmits and receives data.

The information storage 43 stores ISP's subscriber management information b, subscriber identification information c and subscriber setting information d. The ISP's subscriber management information b, the subscriber identification information c and the subscriber setting information d are associated with each other for each subscriber.

The ISP's subscriber management information b is information concerning subscribers. Examples of the ISP's subscriber management information b include personal information (such as name, address and telephone number) and authentication information for accessing the ISP network 6 through the use of the subscriber terminal equipment 1, such as the ID of PPPoE (Point to Point Protocol over Ethernet).

The subscriber setting information d is information necessary to use telecommunications service with the subscriber terminal equipment 1. For example, the subscriber setting information d contains a password to allow the subscriber terminal equipment 1 access to the ISP network 6.

The telecommunications carrier network 5 connects the intermediary equipment 2 to the telecommunications carrier server 3 as well as connecting the equipment 2 to the ISP server 4.

The ISP network 6 is a network through which an ISP provides access services to subscribers. For example, the ISP network 6 may be the Internet.

Figure 5:
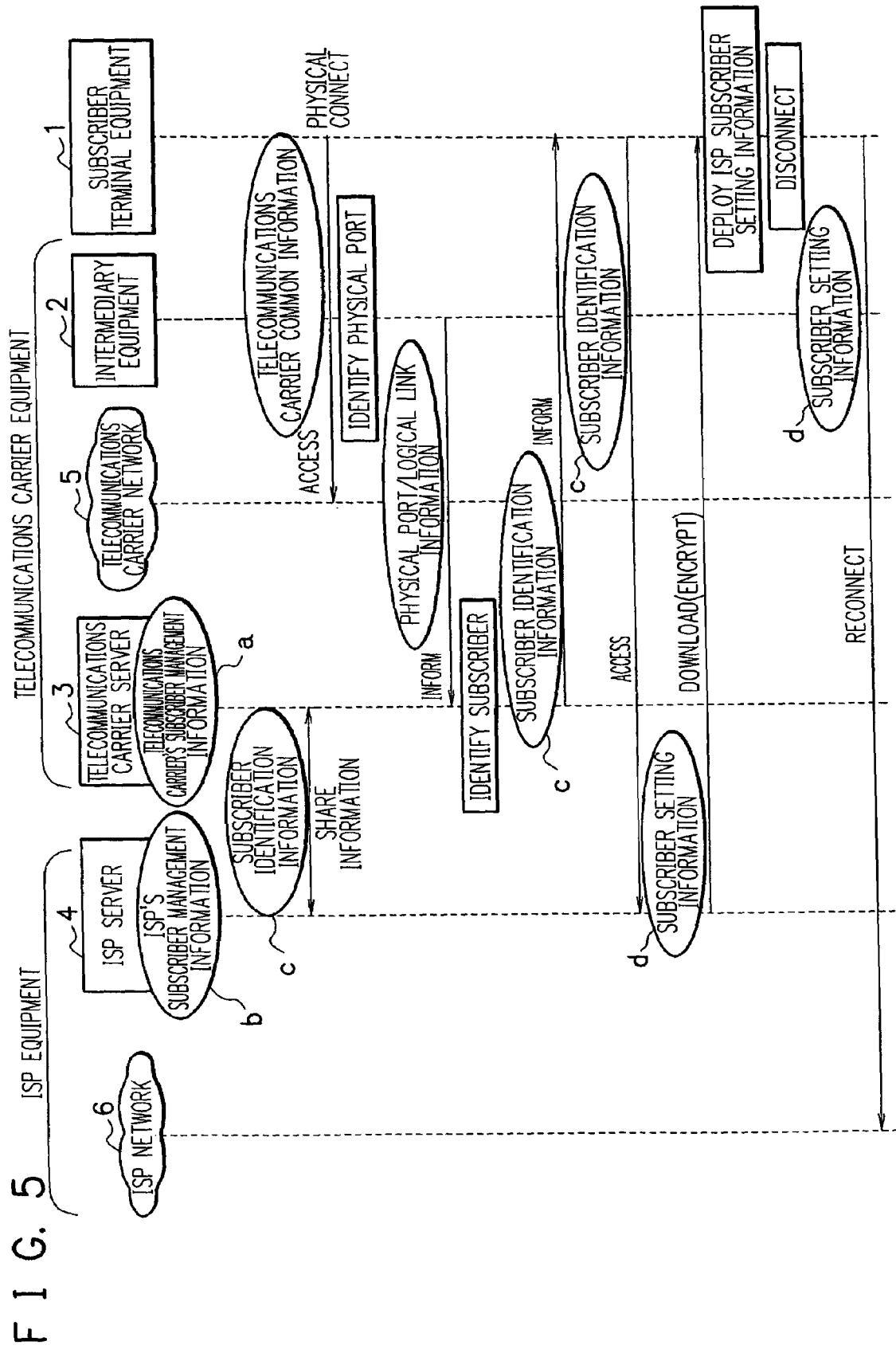
FIG. 5 is a sequence diagram showing the operation of the network connection system according to the embodiment of the present invention.
Figure 6:
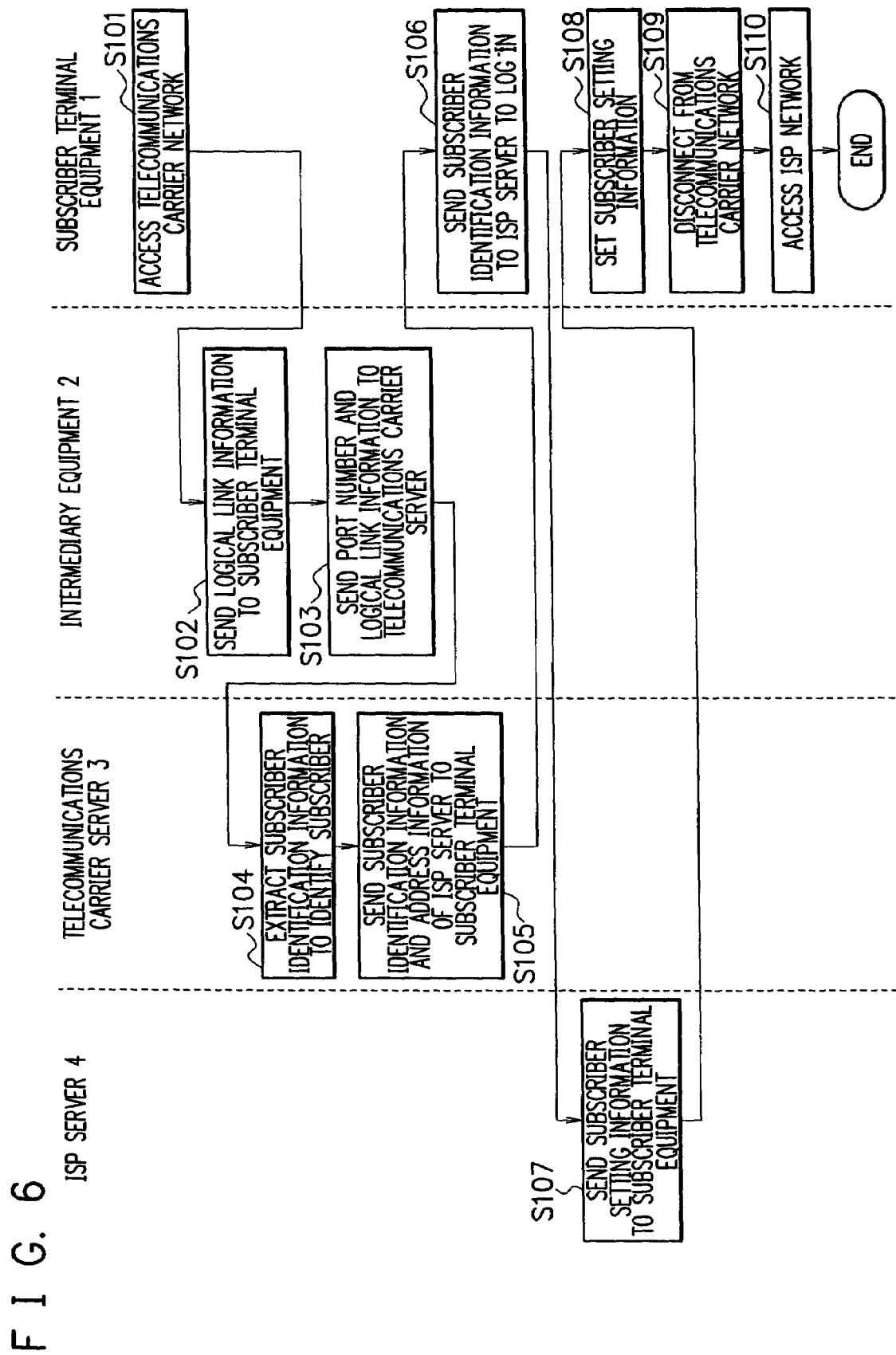
FIG. 6 is a flowchart showing the operation flow of the network connection system according to the embodiment of the present invention.

FIG. 5 is a sequence diagram showing the operation of the network connection system according to the embodiment of the present invention. FIG. 6 is a flowchart showing the operation flow of the network connection system according to the embodiment of the present invention.

Referring to FIGS. 5 and 6, a description will be given of the operation of the network connection system of this embodiment for automatically establishing a network connection.

First, the subscriber terminal equipment 1 accesses physically the telecommunications carrier network 5 via the the access line and the physical port 24 of the intermediary equipment 2 using the telecommunications carrier common information, such as a password, an ID (Identification) number or the like necessary for access to the telecommunications carrier network 5 (step S101).

When accessed from the subscriber terminal equipment 1, the intermediary equipment 2 obtains the logical link information of the equipment 1 such as MAC (Media Access Control) address.

In response to the request for connection from the subscriber terminal equipment 1 (step S101), the intermediary equipment 2 sends the equipment 1 logical link information such as IP (Internet Protocol) address (step S102).

In the intermediary equipment 2, when the logical link information is input to the physical port 24, the controller 21 recognizes that the subscriber terminal equipment 1 has been connected to the physical port. The transmitter-receiver 22 sends the telecommunications carrier server 3 information on the port number of the physical port to which the subscriber terminal equipment 1 has been connected (physical link information) and the logical link information input to the physical port (step S103).

In the telecommunications carrier server 3, when the transmitter-receiver 32 receives the physical link information and the logical link information from the intermediary equipment 2, the controller 31 refers to the telecommunications carrier's subscriber management information a and subscriber identification information c stored in the information storage 33. Thereby, the controller 31 extracts the subscriber identification information c associated with the physical port number received by the transmitter-receiver 32, and identifies the subscriber corresponding to the port number (step S104).

Subsequently, the transmitter-receiver 32 sends the subscriber terminal equipment 1 the subscriber identification information c extracted by the controller 31 and address information of the ISP server 4 based on the logical link information received together with the physical port number (step S105).

In the subscriber terminal equipment 1, having received the subscriber identification information c and the address information of the ISP server 4, the transmitter-receiver 12 accesses the server 4 based on the received information. Then, the transmitter-receiver 12 sends the ISP server 4 the subscriber identification information c to log into the server 4 (step S106).

In the ISP server 4, when the transmitter-receiver 42 receives the subscriber identification information c from the subscriber terminal equipment 1, the controller 41 refers to the ISP's subscriber management information b, subscriber identification information c and subscriber setting information d stored in the information storage 43. Thereby, the controller 41 extracts the subscriber setting information d associated with the subscriber identification information c received by the transmitter-receiver 42 to send it to the subscriber terminal equipment 1 which has sent the information c thereto (step S107).

In the subscriber terminal equipment 1, when the transmitter-receiver 12 receives the subscriber setting information d, the controller 11 sets the information d in the information storage 13 (step S108).

Next, the subscriber terminal equipment 1 disconnects from the telecommunications carrier network 5 (step S109).

After that, the subscriber terminal equipment 1 accesses the ISP network 6 according to the subscriber setting information d (step. S110). Thus, the subscriber terminal equipment 1 is given access to the ISP network 6.

As is described above, according to this embodiment, subscribers can access the ISP network 6 only by connecting their subscriber terminal equipment 1 to the intermediary equipment 2. Consequently, subscribers can use the ISP network 6 without regard for the setting necessary for access to the ISP network 6.

Moreover, in this embodiment, the ISP server 4 sets the subscriber setting information d for the subscriber terminal equipment 1. Accordingly, subscribers can access the ISP network 6 even if the subscribers do not have any input terminal for making such setting. Therefore, an ISP can offer IP telephone services to subscribers who have an IP telephone only but no Internet access device.

Further, in this embodiment, a subscriber is identified based on the information of the physical port in the intermediary equipment 2 instead of unique information retained in the subscriber terminal equipment 1. Thus, it becomes easy for an ISP to set the subscriber setting information d unique to a subscriber for the subscriber terminal equipment 1 the subscriber currently possesses even in cases, for example, where the subscriber has changed his/her subscriber terminal equipment 1, where the ISP has wrongly delivered the subscriber terminal equipment 1 to the subscriber, and where the subscriber terminal equipment 1 has been bought and sold between the subscriber and another subscriber.

Still further, in this embodiment, a telecommunications carrier and an ISP identify a subscriber based on the subscriber identification information c which they have in common. Thus, the ISP can allow the subscriber terminal equipment 1 access to the ISP network 6 without disclosing the subscriber setting information d to outsiders such as the telecommunications carrier.

In order that the present invention may be clearly understood, concrete embodiments thereof will now be described.

In the first embodiment, the present invention is applied to a network connection system in which an ADSL (Asymmetric Digital Subscriber Line) provider offers the use of ADSL as an access line.

FIG. 7 is a block diagram showing the construction of the network connection system according to the first embodiment of the present invention.

In the following, a description will be made of the construction of the network connection system referring to FIG. 7.

As can be seen in FIG. 7, the network connection system comprises at least one ADSL modems A1, an ADSL intermediary equipment 2, an ADSL provider server A3, an ISP WEB server A4, an ADSL provider network A5, and an ISP network A6.

Incidentally, the ADSL modem A1, ADSL intermediary equipment A2, ADSL provider server A3, ISP WEB server A4, ADSL provider network A5 and ISP network A6 correspond to the aforementioned subscriber terminal equipment 1, intermediary equipment 2, telecommunications carrier server 3, ISP server 4, telecommunications carrier network 5 and ISP network 6, respectively.

The ADSL modem A1 is an ADSL communication control device which is installed in a place (subscriber's home, office, etc.) associated with a subscriber who has a contract with an ISP and uses telecommunications services such as Internet access service and IP telephone service.

In the case of communication through the use of the ADSL modem A1, communication is conducted in conformity with the G. 9921a (G. DMT) standard defined by ITU-T (Telecommunication Standardization Sector of the International Telecommunication Union).

The network connection system of this embodiment includes one or more ADSL modems A1, and each of the ADSL modems A1 is connected via an access line to the ADSL intermediary equipment A2.

Besides, as shown in FIG. 7, the ADSL modem A1 is provided with a controller 11a, a transmitter-receiver 12a and an information storage 13a.

The controller 11a is connected with the transmitter-receiver 12a and the information storage 13a to control the entire ADSL modem A1 including the transmitter-receiver 12a and the information storage 13a. The controller 11a may include a CPU and a storage area for storing a program that makes the CPU perform its operations.

The transmitter-receiver 12a transmits and receives data via the access line, and carries out operations, such as for example modulation and demodulation.

The information storage 13a stores in advance information for accessing the ADSL provider network A5 (hereinafter referred to as ADSL provider common information). The information storage 13a also stores in advance a secret or private key for the ID of PPPoE and a password by which the ADSL modem A1 accesses the ADSL provider network A5.

The ADSL intermediary equipment A2 is a network relay device managed by an ADSL provider, and connects the access or ADSL line(s) to the ADSL provider network A5 as well as connecting the ADSL line(s) to the ISP network A6.

As shown in FIG. 7, the ADSL intermediary equipment A2 is provided with a controller 21a, a transmitter-receivers 22a and 25a, an information storage 23a, and a physical port 24a.

The controller 21a is connected with the transmitter-receivers 22a and 25a and the information storage 23a to control the entire ADSL intermediary equipment A2 including the transmitter-receivers 22a and 25a and the information storage 23a. The controller 21a may include a CPU and a storage area for storing a program that makes the CPU perform its operations.

The transmitter-receiver 22a transmits and receives data via the ADSL provider network A5 or the ISP network A6.

The physical port 24a is composed of one or more physical ports. The one or more physical ports have one or more lines, each connected to the different ADSL modem A1.

A port number or a physical port number is assigned to each physical port to identify the port. Each physical port is uniquely associated with ATM PVC (Asynchronous Transfer Mode Permanent Virtual Connection). The information storage 23a stores information as to the association between each physical port and the ATM PVC.

The transmitter-receiver 25a transmits and receives data via each ADSL line connected to the physical port 24a, and carries out operations, such as for example modulation and demodulation.

Having received a request for telecommunications service from one of the ADSL modem A1, the ADSL intermediary equipment A2 informs the ADSL provider server A3 of the port number of the physical port to which the telecommunications service request has been input. In addition, the ADSL intermediary equipment A2 informs the ADSL provider server A3 of logical link information and physical link information of the ADSL modem A1 which has sent the telecommunications service request contained in the request.

The ADSL provider server A3 is an information processor managed by a telecommunications carrier that offers the use of the ADSL line, connecting the ADSL modem A1 to the ADSL provider network A5 as well as connecting the modem A1 to the ISP network A6, to subscribers. Examples of the ADSL provider server A3 include a high-end PC such as a workstation.

As shown in FIG. 7, the ADSL provider server A3 is provided with a controller 31a, a transmitter-receiver 32a and an information storage 33a.

The controller 31a is connected with the transmitter-receiver 32a and the information storage 33a to control the entire ADSL provider server A3 including the transmitter-receiver 32a and the information storage 33a. The controller 31a may include a CPU and a storage area for storing a program that makes the CPU perform its operations.

The transmitter-receiver 32a transmits and receives data.

The information storage 33a stores ADSL provider's subscriber management information a and subscriber identification information c. The ADSL provider's subscriber management information a is information concerning subscribers. Examples of the ADSL provider's subscriber management information a include personal information (such as name, address and telephone number) and the ATM PVC corresponding to the port number of the physical port connected to the ADSL line provided to the place associated with each subscriber: the ADSL line connected to the ADSL modem A1.

The subscriber identification information c is information that uniquely identifies each subscriber. The subscriber identification information c may be a combination of numbers, letters or characters, symbols and the like.

The ADSL provider's subscriber management information a corresponds one-to-one with the subscriber identification information c.

The ISP WEB server A4 is an information processor managed by an ISP that offers service so that subscribers can have access to the Internet (ISP network A6) through the use of the ADSL modem A1. Examples of the ISP WEB server A4 include a high-end PC such as a workstation.

As shown in FIG. 7, the ISP WEB server A4 is provided with a controller 41a, a transmitter-receiver 42a and an information storage 43a.

The controller 41a is connected with the transmitter-receiver 42a and the information storage 43a to control the entire ISP WEB server A4 including the transmitter-receiver 42a and the information storage 43a. The controller 41a may include a CPU and a storage area for storing a program that makes the CPU perform its operations.

The transmitter-receiver 42a transmits and receives data.

The information storage 43a stores ISP's subscriber management information b, subscriber identification information c and subscriber setting information d.

The ISP's subscriber management information b is information concerning subscribers. Examples of the ISP's subscriber management information b include personal information (such as name, address and telephone number) and authentication information for accessing the ISP network A6 through the use of the ADSL modem A1, such as the ID of PPPoE.

The subscriber setting information d is information necessary to use telecommunications service with the ADSL modem A1. For example, the subscriber setting information d contains a password to allow the ADSL modem A1 access to the ISP network A6.

The information storage 43a also stores in advance a public key (corresponding to the secret or private key stored in the ADSL modem A1) for the ID of PPPoE and a password by which the ADSL modem A1 accesses the ISP network A6.

The ADSL provider network A5 connects the ADSL intermediary equipment A2 to the ADSL provider server A3 as well as connecting the equipment A2 to the ISP WEB server A4.

The ISP network A6 is a network through which an ISP provides access services to subscribers. For example, the ISP network A6 may be the Internet.

Figure 8:
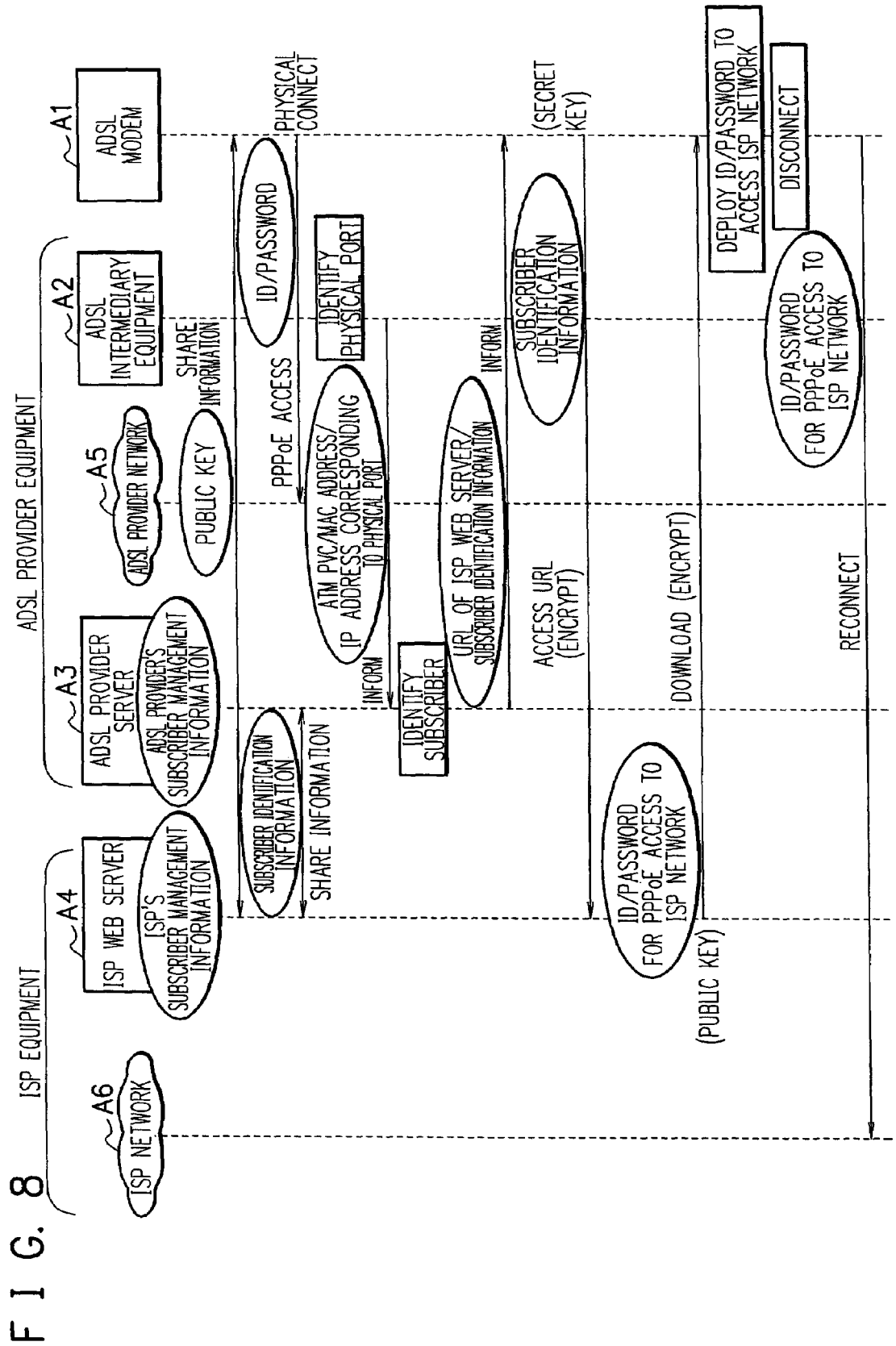
FIG. 8 is a sequence diagram showing the operation of the network connection system depicted in FIG. 7.
Figure 9:
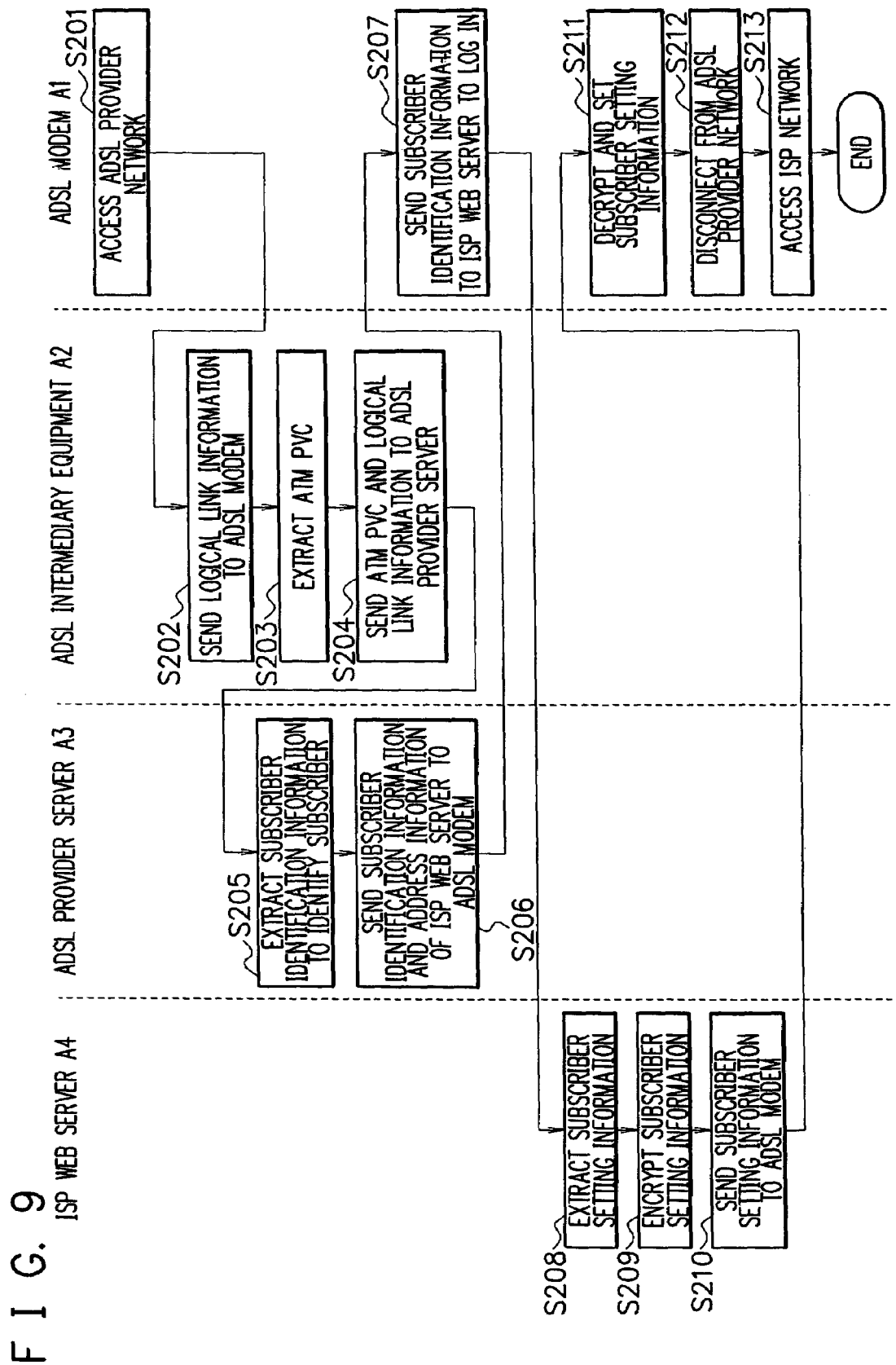
FIG. 9 is a flowchart showing the operation flow of the network connection system depicted in FIG. 7.

FIG. 8 is a sequence diagram showing the operation of the network connection system of the first embodiment. FIG. 9 is a flowchart showing the operation flow of the network connection system of the first embodiment.

Referring to FIGS. 8 and 9, a description will be given of the operation of the network connection system of this embodiment for automatically establishing a network connection. In the network connection system described below, PPPoE is used to authenticate subscribers. However, PPPoA (Point to Point Protocol over ATM) or the like may also be available for authentication.

First, the ADSL modem A1 accesses physically the ADSL provider network A5 via the ADSL line and the physical port 24 of the ADSL intermediary equipment A2 using the ADSL provider common information (step S201).

When accessed from the ADSL modem A1, the ADSL intermediary equipment A2 obtains the logical link information of the modem A1 such as MAC address.

In response to the request for connection from the ADSL modem A1 (step S201), the ADSL intermediary equipment A2 sends the modem A1 logical link information such as IP address (step S202).

In the ADSL intermediary equipment A2, when the logical link information is input to the physical port 24a, the controller 21a recognizes that the ADSL modem A1 has been connected to the physical port. The controller 21a searches the information storage 23a for the ATM PVC corresponding to the physical port to which the ADSL modem A1 has been connected, and extracts it (step S203).

The transmitter-receiver 22a sends the ADSL provider server A3 the extracted ATM PVC (physical link information) and the logical link information input to the physical port (step S204).

In the ADSL provider server A3, when the transmitter-receiver 32a receives the physical link information and the logical link information from the ADSL intermediary equipment A2, the controller 31a refers to the ADSL provider's subscriber management information a and subscriber identification information c stored in the information storage 33a. Thereby, the controller 31a extracts the subscriber identification information c associated with the ATM PVC received by the transmitter-receiver 32a, and identifies the subscriber corresponding to the ATM PVC (step S205).

Subsequently, the transmitter-receiver 32a sends the ADSL modem A1 the subscriber identification information c extracted by the controller 31a and address information or URL (Uniform Resource Locater) of the ISP WEB server A4 based on the logical link information received together with the ATM PVC (step S206).

In the ADSL modem A1, having received the subscriber identification information c and the address information of the ISP WEB server A4, the transmitter-receiver 12a accesses the server A4 based on the received information by, for example, HTTPS (Hyper Text Transport Protocol Security). Then, the transmitter-receiver 12a sends the ISP WEB server A4 the subscriber identification information c to log into the server 4 (step S207).

In the ISP WEB server A4, when the transmitter-receiver 42a receives the subscriber identification information c from the ADSL modem A1, the controller 41a refers to the ISP's subscriber management information b, subscriber identification information c and subscriber setting information d stored in the information storage 43a. Thereby, the controller 41a extracts the subscriber setting information d (the ID of PPPoE and password) associated with the subscriber identification information c received by the transmitter-receiver 42a (step S208).

Thereafter, the controller 41a encrypts the extracted ID of PPPoE and password with the public key corresponding to the relevant subscriber (step S209).

The transmitter-receiver 42a send the encrypted ID of PPPoE and password to the ADSL modem A1 which has sent the subscriber identification information c thereto (step S210).

In the ADSL modem A1, when the transmitter-receiver 12a receives the ID of PPPoE and password, the controller 11a decrypts the received ID of PPPoE and password with the secret or private key to set them in the information storage 13a (step S211).

Next, the ADSL modem A1 disconnects from the ADSL provider network A5 (step S212).

After that, the ADSL modem A1 accesses the ISP network A6 according to the subscriber setting information d (step S213). Thus, the ADSL modem A1 is given access to the ISP network A6.

As is described above, according to the first embodiment, subscribers can access the ISP network A6 only by connecting their ADSL modem A1 to the ADSL intermediary equipment A2. Consequently, subscribers can use the ISP network A6 without regard for the setting necessary for access to the ISP network A6.

Moreover, in this embodiment, the ISP WEB server A4 sets the subscriber setting information d for the ADSL modem A1. Accordingly, subscribers can access the ISP network A6 even if the subscribers do not have any input terminal for making such setting. Therefore, an ISP can offer IP telephone services to subscribers who have an IP telephone only but no Internet access device.

Further, in this embodiment, a subscriber is identified based on the information of the physical port in the ADSL intermediary equipment A2 instead of unique information retained in the ADSL modem A1. Thus, it becomes easy for an ISP to set the subscriber setting information d unique to a subscriber for the ADSL modem A1 the subscriber currently possesses even in cases, for example, where the subscriber has changed his/her ADSL modem A1, where the ISP has wrongly delivered the ADSL modem A1 to the subscriber, and where the ADSL modem A1 has been bought and sold between the subscriber and another subscriber.

Still further, in this embodiment, an ADSL provider and an ISP identify a subscriber based on the subscriber identification information c which they have in common. Thus, the ISP can allow the ADSL modem A1 access to the ISP network A6 without disclosing the ID of PPPoE and password to outsiders such as the ADSL provider.

In the following, the second embodiment of the present invention will be described.

A network connection system of the second embodiment is of the same construction and operates in the same manner as that of the first embodiment if not specified below.

In this embodiment, the information storage 13a of the ADSL modem A1 also stores specification information: information on the specifications of the modem A1 itself.

The information storage 33a of the ADSL provider server A3 also stores one or more pieces of specification information: information on the specifications of each ADSL modem A1. In the information storage 33a, the specification information is associated with the physical link information of each ADSL modem A1 and the like.

Figure 10:
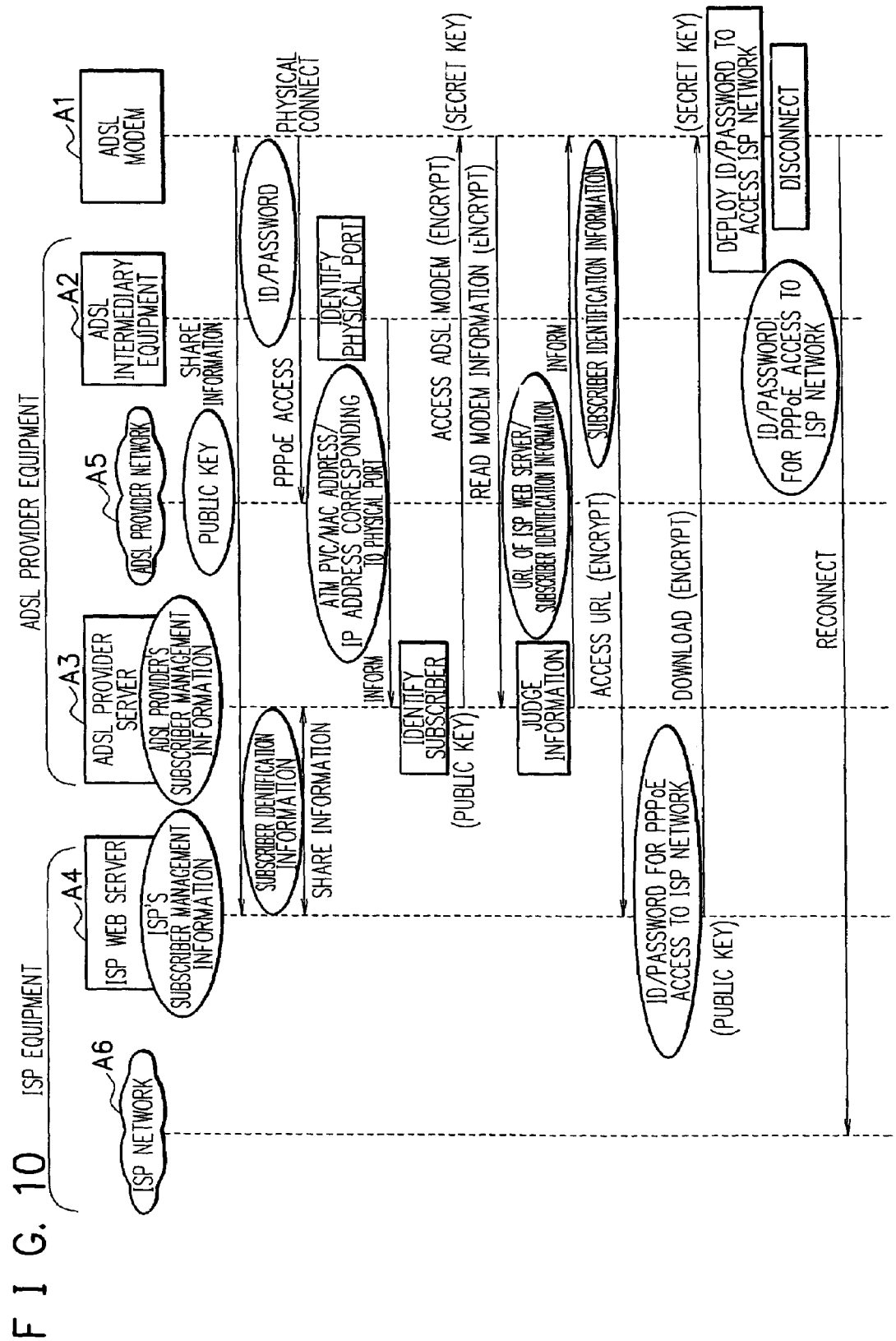
FIG. 10 is a sequence diagram showing the operation of a network connection system according to the second embodiment of the present invention.
Figure 11:
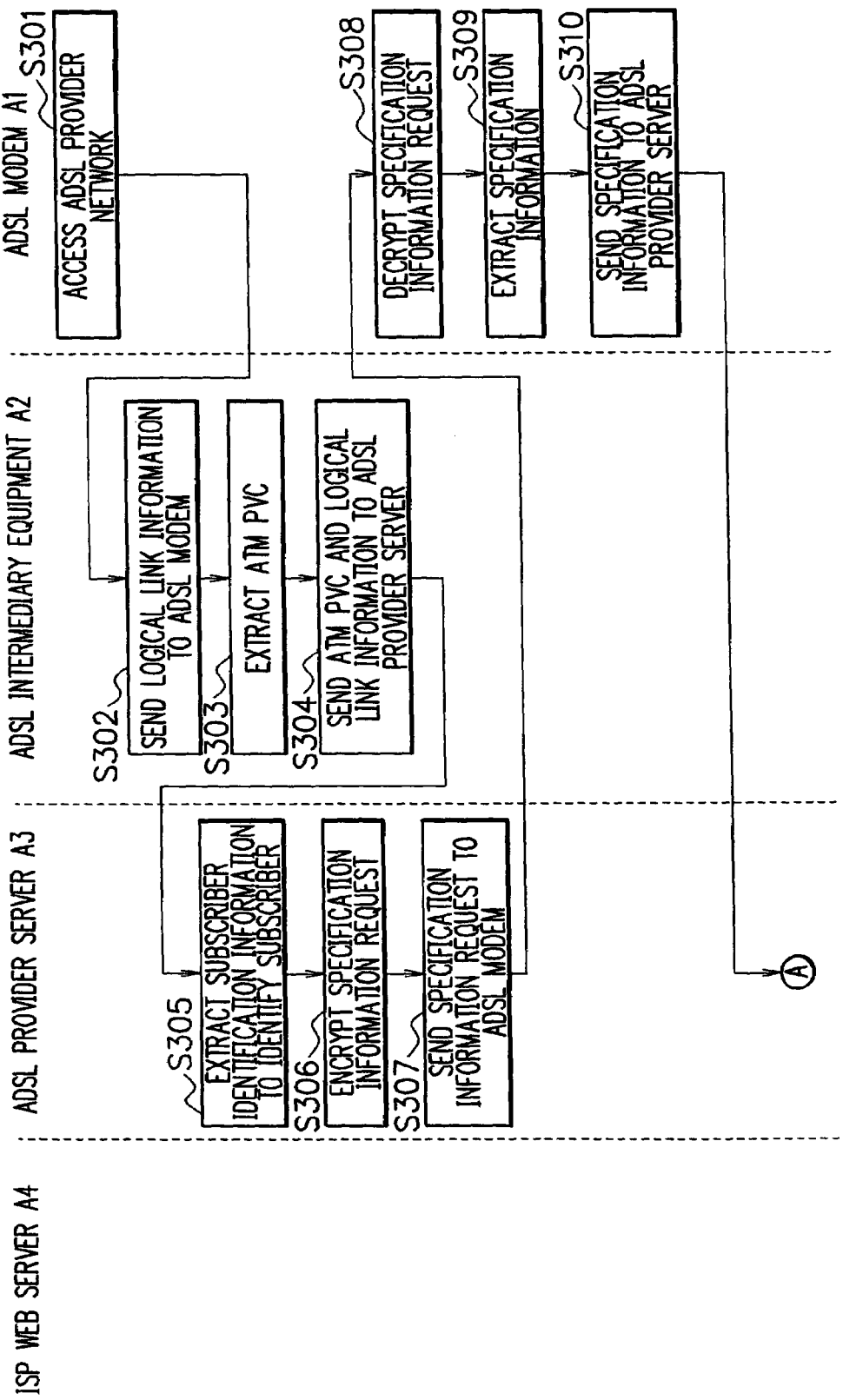
FIG. 11 is a flowchart showing the operation flow of the network connection system according to the second embodiment of the present invention.
Figure 12:
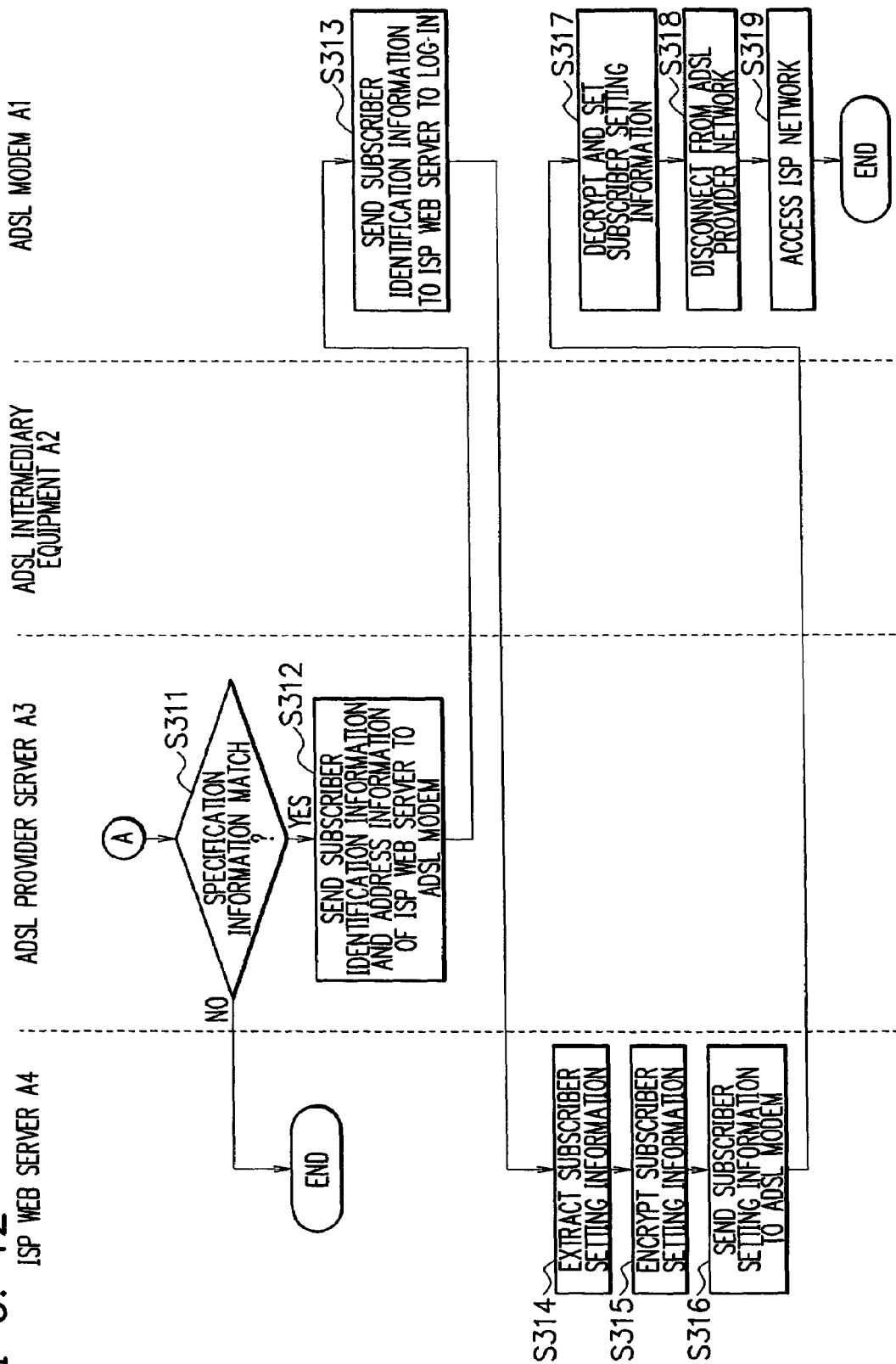
FIG. 12 is a flowchart showing the operation flow of the network connection system according to the second embodiment of the present invention.

FIG. 10 is a sequence diagram showing the operation of the network connection system according to the second embodiment of the present invention. FIGS. 11 and 12 are flowcharts showing the operation flow of the network connection system of the second embodiment.

Referring to FIGS. 5 and 10 to 12, a description will be given of the operation of the network connection system of this embodiment for automatically establishing a network connection.

In FIG. 11, operations in steps S301 to S305 are the same as those in steps S201 to 205 in FIG. 9 and will not be described herein.

In the ADSL provider server A3, when the transmitter-receiver 32a receives the physical link information and the logical link information from the ADSL intermediary equipment A2, the controller 31a encrypts a request for information on the specifications of the ADSL modem A1 with the public key of the subscriber corresponding to the received information (step S306).

Subsequently, the transmitter-receiver 32a sends the ADSL modem A1 the encrypted request for the specification information based on the received logical link information such as IP address and MAC address (step S307).

In the ADSL modem A1, when the transmitter-receiver 12a receives the encrypted request for the specification information, the controller 11a decrypts the encrypted request with the secret or private key (step S308).

In response to the decrypted request for the specification information, the controller 11a extracts the information on the specifications of the ADSL modem A1, such as the product name and firmware version of the modem A1 (step S309).

The transmitter-receiver 12a sends the ADSL provider server A3 the specification information extracted by the controller 11a (step S310).

In the ADSL provider server A3, when the transmitter-receiver 32a receives the specification information, the controller 31a extracts information on the specifications of the ADSL modem A1 used by the subscriber identified in step S305. Then, the controller 31a determines whether or not the received specification information matches the extracted specification information (step S311).

When the received specification information does not match the extracted specification information (step S311/No), the operation is terminated.

When the received specification information matches the extracted specification information (step S311/Yes), the transmitter-receiver 32a sends the ADSL modem A1 the subscriber identification information c extracted in step S305 and address information or URL of the ISP WEB server A4 based on the logical link information received together with the ATM PVC (step S312).

The operations from step S313 are the same as those from step S207 in FIG. 9 and will not be described herein.

As is described above, according to the second embodiment, the ADSL modem A1 connected to the ADSL intermediary equipment A2 can be identified. Therefore, it is possible to prevent the access of a "spoofer" or "masquerader" who tries to obtain provider or ISP subscriber information (subscriber setting information d, etc.) with an unauthorized ADSL modem A1.

In the following, the third embodiment of the present invention will be described.

In the third embodiment, the present invention is applied to a network connection system, in which the same CATV (cable television service) company provides both telecommunications services and Internet access services, and offers the use of a CATV network as an access line to subscribers.

FIG. 13 is a block diagram showing the construction of the network connection system according to the third embodiment of the present invention.

In the following, a description will be made of the construction of the network connection system referring to FIG. 13.

As can be seen in FIG. 13, the network connection system comprises at least one IP telephone terminal B1, a CATV modem equipment B2, a CATV company server B3, a CATV company network B4, and an IP telephone company server B6.

Incidentally, the IP telephone terminal B1, CATV modem equipment B2, CATV company server B3, and IP telephone company server B6 correspond to the aforementioned subscriber terminal equipment 1, intermediary equipment 2, telecommunications carrier server 3, and ISP server 4, respectively.

The IP telephone terminal B1 is an IP telephone which is used by a subscriber who has a contract with a CATV company.

The network connection system of this embodiment includes one or more IP telephone terminals B1, and each of the IP telephone terminals B1 is connected via a CATV line to the CATV modem equipment B2.

Besides, as shown in FIG. 13, the IP telephone terminal B1 is provided with a controller 11*b*, a transmitter-receiver 12*b* and an information storage 13*b*.

The controller 11*b* is connected with the transmitter-receiver 12*b* and the information storage 13*b* to control the entire IP telephone terminal B1 including the transmitter-receiver 12*b* and the information storage 13*b*. The controller 11*b* may include a CPU and a storage area for storing a program that makes the CPU perform its operations.

The transmitter-receiver 12*b* transmits and receives data via the CATV line, and carries out operations, such as for example modulation and demodulation.

The information storage 13*b* stores in advance information for accessing the CATV company network B4. The information storage 13*b* also stores in advance a secret or private key for decrypting IP telephone access information from which the IP telephone terminal B1 accesses the IP telephone company server B6.

When the IP telephone terminal B1 is connected to the IP telephone company server B6, IP telephone services become available through the terminal B1.

The CATV modem equipment B2 is a network relay device managed by a CATV company, and connects the CATV line(s) to the CATV company network B4 as well as connecting the CATV line(s) to the IP telephone company server B6. Each IP telephone terminal B1 is provided with a CATV modem.

As shown in FIG. 13, the CATV modem equipment B2 is provided with a controller 21*b*, a transmitter-receivers 22*b* and 25*b*, an information storage 23*b*, and a physical port 24*b*.

The controller 21*b* is connected with the transmitter-receivers 22*b* and 25*b* and the information storage 23*b* to control the entire CATV modem equipment B2 including the transmitter-receivers 22*b* and 25*b* and the information storage 23*b*. The controller 21*b* may include a CPU and a storage area for storing a program that makes the CPU perform its operations.

The transmitter-receiver 22*b* transmits and receives data.

The physical port 24*b* is composed of one or more physical ports. The one or more physical ports have one or more CATV lines, each connected to the different IP telephone terminal B1.

A port number or a physical port number is uniquely assigned to each physical port. The information storage 23*a* stores information as to the association between each physical port and the physical port number.

The transmitter-receiver 25*b* transmits and receives data via each CATV line connected to the physical port 24*b*, and carries out operations, such as for example modulation and demodulation.

Having received a request for subscription to IP telephone service from one of the IP telephone terminals B1, the CATV modem equipment B2 informs the CATV company server B3 of the port number of the physical port to which the IP telephone service request has been input. In addition, the CATV modem equipment B2 informs the CATV company server B3 of logical link information and physical link information of the IP telephone terminal B1 which has sent the IP telephone service subscription request contained in the request.

The CATV company server B3 is an information processor managed by a CATV company. Examples of the CATV company server B3 include a high-end PC such as a workstation.

As shown in FIG. 13, the CATV company server B3 is provided with a controller 31*b*, a transmitter-receiver 32*b* and an information storage 33*b*.

The controller 31*b* is connected with the transmitter-receiver 32*b* and the information storage 33*b* to control the entire CATV company server B3 including the transmitter-receiver 32*b* and the information storage 33*b*. The controller 31*b* may include a CPU and a storage area for storing a program that makes the CPU perform its operations.

The transmitter-receiver 32*b* transmits and receives data.

The information storage 33*b* stores subscriber management information and IP telephone access information each being associated with subscriber identification information with respect to each subscriber.

The subscriber management information is information concerning subscribers. Examples of the subscriber management information include personal information (such as name, address and telephone number) and information as to the physical port in the CATV modem equipment B2 assigned to the IP telephone terminal B1 of each subscriber.

The IP telephone access information is information necessary for the IP telephone terminal B1 to access the IP telephone company server B6. Examples of the IP telephone access information include a password and an ID number. The IP telephone access information is associated with the subscriber identification information, and sent from the IP telephone company server B6 to the CATV company server B3 in advance.

The subscriber identification information is information that uniquely identifies each subscriber. The subscriber identification information may be a combination of numbers, letters or characters, symbols and the like.

The information storage 33*b* also stores a public key corresponding to the secret or private key stored in the IP telephone terminal B1.

The IP telephone company server B6 is an information processor managed by an IP telephone company that offers IP telephone services to subscribers. Examples of the IP telephone company server B6 include a high-end PC such as a work station.

When the IP telephone terminal B1 is connected to an IP telephone network, the IP telephone company server B6 provides IP telephone services.

As shown in FIG. 13, the IP telephone company server B6 is provided with a controller 41*b*, a transmitter-receiver 42*b* and an information storage 43*b*.

The controller 41*b* is connected with the transmitter-receiver 42*b* and the information storage 43*b* to control the entire IP telephone company server B6 including the transmitter-receiver 42*b* and the information storage 43*b*. The controller 41*b* may include a CPU and a storage area for storing a program that makes the CPU perform its operations.

The transmitter-receiver 42*b* transmits and receives data.

The information storage 43*b* stores subscriber management information and IP telephone access information which are associated with each other.

The CATV company network B4 is a network which connects the CATV modem equipment B2 with the CATV company server B3.

Figure 14:
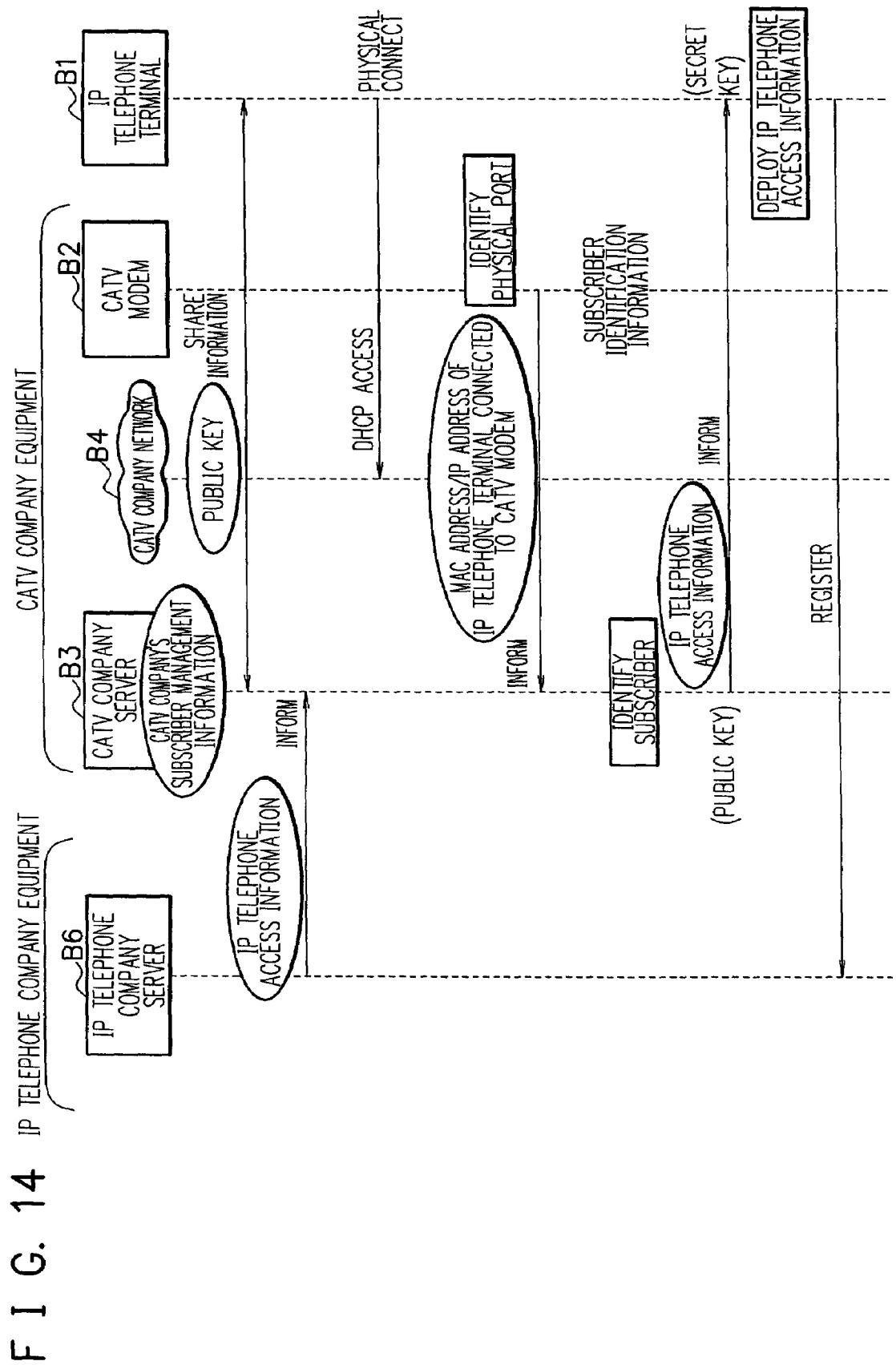
FIG. 14 is a sequence diagram showing the operation of the network connection system depicted in FIG. 13.

FIG. 14 is a sequence diagram showing the operation of the network connection system of the third embodiment. FIG. 15 is a flowchart showing the operation flow of the network connection system of the third embodiment.

Referring to FIGS. 14 and 15, a description will be given of the operation of the network connection system of this embodiment for automatically establishing a network connection.

First, the IP telephone terminal B1 accesses physically the CATV company network B4 via the physical port 24 of the CATV modem equipment B2 (step S401).

When accessed from the IP telephone terminal B1 by DHCP (Dynamic Host Configuration Protocol), the CATV modem equipment B2 obtains the logical link information of the terminal B1 such as MAC address.

In response to the request for connection from the IP telephone terminal B1 (step S401), the CATV modem equipment B2 sends the terminal B1 logical link information such as IP address (step S402).

In the CATV modem equipment B2, when the logical link information is input to the physical port 24b, the controller 21b recognizes that the IP telephone terminal B1 has been connected to the physical port. The controller 21b searches the information storage 23b for the port number of the physical port to which the IP telephone terminal B1 has been connected, and extracts it (step S403).

The transmitter-receiver 22b sends the CATV company server B3 the extracted physical port number (physical link information) and the logical link information input to the physical port using, for example, SNMP (Simple Network Management Protocol) (step S404).

In the CATV company server B3, when the transmitter-receiver 32b receives the physical link information and the logical link information from the CATV modem equipment B2, the controller 31b refers to information stored in the information storage 33b. Thereby, the controller 31b extracts the IP telephone access information associated with the physical port number received by the transmitter-receiver 32b, and identifies the subscriber corresponding to the physical port number (step S405).

The controller 31b encrypts the extracted IP telephone access information with the public key (step S406).

Subsequently, the transmitter-receiver 32b sends the IP telephone terminal B1 the encrypted IP telephone access information and address information of the IP telephone company server B6 based on the logical link information received together with the physical port number by HTTPS (step S407).

In the IP telephone terminal B1, when the transmitter-receiver 12b receives the IP telephone access information and address information of the IP telephone company server B6, the controller 11b decrypts the received IP telephone access information with the secret or private key, and sets the information in the information storage 13b (step S408).

After that, the IP telephone terminal B1 sends the IP telephone company server B6 the decrypted IP telephone access information for registration (step S409). Thus, IP telephone services become available through the IP telephone terminal B1.

As is described above, according to the third embodiment, a subscriber can be identified regardless of the location of the CATV modem. Therefore, it is possible to make a subscriber setting for the IP telephone terminal B1 with an external CATV modem.

Moreover, in the case where a third party monitors communication between the IP telephone terminal B1 and the CATV modem equipment B2, information that a CATV company want to keep in secrecy can be protected.

Incidentally, the operation of the network connection system is implemented by a program stored in each constituent device and equipment of the system. The program may be stored in a storage medium such as optical storage medium, magnetic storage medium, magneto optic storage medium and semiconductor, and loaded from the storage medium. The program may be loaded from an external device to which each constituent device and equipment of the system connects via a prescribed network.

As set forth hereinabove, in accordance with the present invention, it is possible to provide network access service to subscriber terminal equipment easily without using information unique to a subscriber.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A system comprising:
   at least one user terminal;
   an Internet service provider; and
   a telecommunications carrier terminal for connecting the user terminal and the Internet service provider; wherein:
   when the user terminal is connected to the telecommunications carrier terminal, the telecommunications carrier terminal assigns and sends logical link information to the user terminal, and sends information including the logical link information to a server of the telecommunications carrier;
   the telecommunications carrier server identifies the user terminal connected to the telecommunications carrier terminal based on the information including the logical link information, extracts user identification information associated with the information including the logical link information, and sends the user identification information to the identified user terminal, said user identification information being stored in said telecommunications carrier server prior to receiving the information including the logical link information;
   the identified user terminal sends the user identification information to a sewer of the Internet service provider which extracts subscriber setting information associated with the user identification information and sends the subscriber setting information to the identified user terminal;
   the identified user terminal stores the subscriber setting information, and accesses the Internet service provider using the subscriber setting information;
   the user terminal does not require any input from a user of the user terminal in order to connect to the telecommunications carrier terminal or to obtain the information for access to the Internet service provider; and
   the telecommunications carrier server is distinct from the server of the Internet service provider.

2. The system claimed in claim 1, wherein:
   the information including the logical link information further includes a physical port number;
   the telecommunications carrier server extracts the user identification information based on the information including the logical link information and the physical port number to identify the user terminal; and
   the telecommunications carrier server sends information including the user identification information and address information of the Internet service provider to the identified user terminal.

3. The system claimed in claim 2, wherein:
the user terminal accesses an Internet service provider network using setting information received from the Internet service provider.

4. The system claimed in claim 1, wherein:
the telecommunications carrier terminal is an ADSL (Asymmetric Digital Subscriber Line) provider terminal;
the user terminal is connected to the telecommunications carrier terminal through an ADSL modem;
the information including the logical link information further includes ATM PVC (Asynchronous Transfer Mode Permanent Virtual Connection) corresponding to a physical port to which the user terminal has been connected;
the telecommunications carrier server extracts user identification information based on the information including the logical link information and the ATM PVC to identify the user terminal; and
the telecommunications carrier server sends information including the user identification information and address information of the Internet service provider to the identified user terminal.

5. The system claimed in claim 4, wherein:
the user terminal accesses an Internet service provider network using setting information received from the Internet service provider.

6. The system claimed in claim 1, wherein:
the telecommunications carrier terminal is an ADSL (Asymmetric Digital Subscriber Line) provider terminal;
the user terminal is connected to the telecommunications carrier terminal through an ADSL modem;
the information including the logical link information further includes ATM PVC (Asynchronous Transfer Mode Permanent Virtual Connection) corresponding to a physical port to which the user terminal has been connected;
the telecommunications carrier server extracts user identification information based on the information including the logical link information and the ATM PVC to identify the user terminal; and
the telecommunications carrier server encrypts a request for information on the specifications of the ADSL modem of the identified user terminal with a public key of the user terminal, and sends the encrypted request for the specification information to the user terminal through the ADSL modem.

7. The system claimed in claim 1, wherein:
the telecommunications carrier terminal is an ADSL (Asymmetric Digital Subscriber Line) provider terminal;
the user terminal is connected to the telecommunications carrier terminal through an ADSL modem;
the information including the logical link information further includes ATM PVC (Asynchronous Transfer Mode Permanent Virtual Connection) corresponding to a physical port to which the user terminal has been connected;
the telecommunications carrier server extracts user identification information based on the information including the logical link information and the ATM PVC to identify the user terminal;
the telecommunications carrier server encrypts a request for information on the specifications of the ADSL modem of the identified user terminal with a public key of the user terminal, and sends the encrypted request for the specification information to the user terminal through the ADSL modem; and
the user terminal sends the specification information to the telecommunications carrier server in response to the request for the specification information.

8. The system claimed in claim 1, wherein:
the telecommunications carrier terminal is a CATV (cable television) company terminal;
the user terminal is an IP (Internet Protocol) telephone connected to the telecommunications carrier terminal through an CATV modem using DHCP (Dynamic Host Configuration Protocol);
the information including the logical link information further includes a port number of a physical port to which the user terminal has been connected as physical link information;
the telecommunications carrier server extracts IP telephone access information based on the information including the logical link information and the physical link information to identify the user terminal; and
the telecommunications carrier server encrypts the IP telephone access information with a public key of the identified user terminal, and sends the encrypted IP telephone access information to the user terminal through the CATV modem.

9. The system claimed in claim 1, wherein:
the user terminal accesses an Internet service provider network using setting information received from the Internet service provider.

10. The system claimed in claim 1, wherein the subscriber setting information comprises a password for accessing the Internet service provider.

11. A network connection method applied to a system comprising:
at least one user terminal; an Internet service provider; and a telecommunications carrier terminal for connecting the user terminal and the Internet service provider; the network connection method comprising the steps of:
by the telecommunications carrier terminal, assigning and sending logical link information to the user terminal, and sending information including the logical link information to a sewer of the telecommunications carrier when the user terminal is connected to the telecommunications carrier terminal;
by the telecommunications carrier sewer, identifying the user terminal connected to the telecommunications carrier terminal based on the information including the logical link information, extracting user identification information associated with the information including the logical link information, and sending the user identification information to the identified user terminal, said user identification information being stored in said telecommunications carrier server prior to receiving the information including the logical link information;
by the identified user terminal, sending the user identification information to a server of the Internet service provider;
by the server of the Internet service provider, extracting subscriber setting information associated with the user identification information and sending the subscriber setting information to the identified user terminal; and
by the identified user terminal, storing the subscriber setting information, and accessing the Internet service provider using the subscriber setting information,
wherein the user terminal does not require any input from a user of the user terminal in order to connect to the telecommunications carrier terminal or to obtain the information for access to the Internet service provider, and wherein the telecommunications carrier server is distinct from the server of the Internet service provider.

12. The network connection method of claim 11, wherein the subscriber setting information comprises a password for accessing the Internet service provider.

* * * * *